US009727166B2

(12) United States Patent
Takeda et al.

(10) Patent No.: US 9,727,166 B2
(45) Date of Patent: Aug. 8, 2017

(54) PROXIMITY-DEPENDENT ADJUSTABLE-SIGNAL TOUCH PANEL SYSTEM

(71) Applicant: SHARP KABUSHIKI KAISHA, Osaka-shi, Osaka (JP)

(72) Inventors: Michiaki Takeda, Osaka (JP); Mamoru Takaya, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/899,151

(22) PCT Filed: Jul. 1, 2014

(86) PCT No.: PCT/JP2014/067576
§ 371 (c)(1),
(2) Date: Dec. 17, 2015

(87) PCT Pub. No.: WO2015/002203
PCT Pub. Date: Jan. 8, 2015

(65) Prior Publication Data
US 2016/0139732 A1 May 19, 2016

(30) Foreign Application Priority Data
Jul. 5, 2013 (JP) .................................. 2013-141984

(51) Int. Cl.
G06F 3/041 (2006.01)
G06F 3/0354 (2013.01)
G06F 3/044 (2006.01)
G06F 3/047 (2006.01)

(52) U.S. Cl.
CPC ........ *G06F 3/0416* (2013.01); *G06F 3/03545* (2013.01); *G06F 3/044* (2013.01); *G06F 3/047* (2013.01)

(58) Field of Classification Search
CPC ..... G06F 3/03545; G06F 3/044; G06F 3/0416
See application file for complete search history.

(56) References Cited

U.S. PATENT DOCUMENTS

| 2010/0066693 | A1 | 3/2010 | Sato et al. |
| 2012/0013555 | A1 | 1/2012 | Maeda et al. |
| 2012/0050207 | A1* | 3/2012 | Westhues ............ G06F 3/03545 345/174 |
| 2013/0050151 | A1* | 2/2013 | Tu ........................ G06F 3/0416 345/178 |

FOREIGN PATENT DOCUMENTS

| JP | 2010-067117 A | 3/2010 |
| JP | 2012-022543 A | 2/2012 |

* cited by examiner

Primary Examiner — Chanh Nguyen
Assistant Examiner — Sepehr Azari
(74) Attorney, Agent, or Firm — Birch, Stewart, Kolasch & Birch, LLP

(57) ABSTRACT

A touch panel controller is equipped with a control unit that outputs a decimation signal to a drive line driving circuit when touch response magnitude data is a designated value or greater, or in other words, when the distance between a touch panel and a stylus pen is closer than a designated value. Thus, it is possible to realize a touch panel system able to moderate the amount of power consumed when synchronizing drive timings between the pen and the touch panel controller that drives the touch panel, and thereby operate with low power consumption.

4 Claims, 17 Drawing Sheets

US 9,727,166 B2

PROXIMITY-DEPENDENT ADJUSTABLE-SIGNAL TOUCH PANEL SYSTEM

TECHNICAL FIELD

The present invention relates to a touch panel system equipped with a touch panel, a touch panel controller, and a touch pen.

BACKGROUND ART

Recently, the touch panel has become indispensable as means of input for electronic devices. From comparatively large devices such as televisions, monitors, and whiteboards to comparatively small devices such as smartphones and tablets, the touch panel has come to be used generally as a means of input.

Additionally, there have been many proposals for touch panel systems equipped with a dedicated touch pen able to provide not only information related to the touch position, but also additional information (for example, information such as the state of whether or not a button is being pressed, and pen pressure), enabling input with not only a finger but also the dedicated touch pen, and thus enabling the realization of more precise and varied input.

For example, PTL 1 discloses a touch panel system enabling respective touch positions to be detected accurately, even when touch operations by multiple digital pens or fingers are performed simultaneously.

CITATION LIST

Patent Literature

PTL 1: Japanese Unexamined Patent Application Publication No. 2012-22543 (Feb. 2, 2012)

SUMMARY OF INVENTION

Technical Problem

However, in a touch panel system which is equipped with a dedicated touch pen and which detects the touch position of a finger or the like by detecting changes in electrostatic capacitance, in order to enable the detection of touches by a finger and the detection of signals from the dedicated touch pen at the same time and with the same mechanism, the drive timings between the dedicated touch pen and the touch panel controller that drives the touch panel must be synchronized.

However, there is a problem in that realizing such synchronization consumes a comparatively large amount of power.

An objective of the present invention is to provide a touch panel system able to moderate the amount of power consumed when synchronizing drive timings between a pen and a touch panel controller that drives a touch panel, and operate with low power consumption.

Solution to Problem

A touch panel system according to the present invention is a touch panel system including a touch panel having an electrostatic capacitance formed respectively at the intersections between multiple first signal lines and multiple second signal lines, a touch panel controller, and a pen, the touch panel system detecting a touch position from changes in the electrostatic capacitance. The touch panel controller outputs a first synchronization signal for synchronizing the pen and the touch panel controller to each of the multiple first signal lines and/or each of the multiple second signal lines, outputs a driving signal after the first synchronization signal to each of one of either the first signal lines or the second signal lines, and reads a detection signal detecting the touch position from each of the other of either the first signal lines or the second signal lines in conjunction with the driving signal. The touch panel controller computes, on the basis of the detection signal detecting the touch position, the distance between the pen and the touch panel in the period in which the driving signal is output, and if the distance is less than a designated value, the touch panel controller outputs a second synchronization signal having a smaller driving power than the driving power in a case of outputting the first synchronization signal to the first signal lines and/or the second signal lines after the period in which the driving signal is output.

According to the above configuration, when the distance between the pen and the touch panel detected by the touch panel controller is less than a designated value, the touch panel controller outputs a second synchronization signal having a smaller driving power than the driving power in a case of outputting the first synchronization signal to the first signal lines and/or the second signal lines after the period in which the driving signal is output.

Consequently, it is possible to realize a touch panel system able to moderate the amount of power consumed when synchronizing drive timings between a pen and a touch panel controller, and operate with low power consumption.

Advantageous Effects of Invention

According to an aspect of the present invention, it is possible to realize a touch panel system able to moderate the amount of power consumed when synchronizing drive timings between a pen and a touch panel controller that drives a touch panel, and operate with low power consumption.

BRIEF DESCRIPTION OF DRAWINGS

FIG. 10(a) illustrates the case of outputting a synchronization signal to all drives lines $D_0$ to $D_n$, while FIG. 10(b) is a diagram illustrating the case of outputting a synchronization signal only to the drive lines in a region neighboring the touch coordinates from among the drive lines $D_0$ to $D_n$.

FIG. 12(a) illustrates the case of outputting a synchronization signal with a comparatively high voltage value when risen to all drives lines $D_0$ to $D_n$, while FIG. 12(b) is a diagram illustrating the case of outputting a synchronization signal with a comparatively low voltage value when risen to all drive lines $D_0$ to $D_n$.

FIG. 14(a) illustrates a case in which a synchronization signal is output to all drives lines $D_0$ to $D_n$ during a normal period, while FIG. 14(b) is a diagram illustrating a case in which a synchronization signal is output to all drive lines $D_0$ to $D_n$ during a shorter-than-normal period.

FIG. 16(a) illustrates the timings at which drive lines $D_0$ to $D_n$ provided in a touch panel are used as drive lines, while FIG. 16(b) illustrates the timings at which sense lines $S_0$ to $S_k$ provided in a touch panel are used as drive lines.

DESCRIPTION OF EMBODIMENTS

Hereinafter, embodiments of the present invention will be described in detail on the basis of the drawings. However, features such as the dimensions, materials, shapes, and relative arrangement of the components described in the embodiments are merely a possible embodiment, and the interpretation of the claims should not be restricted thereby.

Embodiments of the present invention are described as follows on the basis of FIGS. 1 to 19.

Embodiment 1

An embodiment of the present invention is described as follows on the basis of FIGS. 1 to 8.

(Configuration of Touch Panel System)

Figure 1:
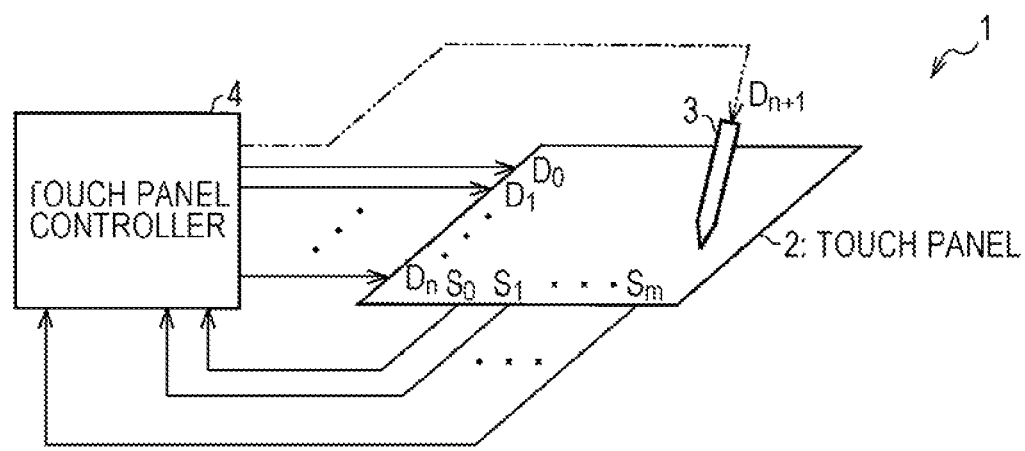
FIG. 1 is a block diagram illustrating a schematic configuration of a touch panel system according to Embodiment 1.

FIG. 1 is a block diagram illustrating a schematic configuration of a touch panel system 1 according to the present embodiment.

As illustrated in the drawing, the touch panel system 1 is equipped with a touch panel 2, a stylus pen (touch pen) 3, and a touch panel controller 4 that drives the touch panel 2 and the stylus pen 3.

Although not illustrated, the touch panel 2 is provided with multiple (a number n of) drive lines $D_0$ to $D_n$ extending parallel in the left-and-right direction of the drawing, and multiple (a number m of) sense lines $S_0$ to $S_m$ extending parallel in the up-and-down direction of the drawing. Additionally, at the locations where each of the above drive lines $D_0$ to $D_n$ intersects each of the above sense lines $S_0$ to $S_m$, an electrostatic capacitance (not illustrated) is provided. Note that m and n above may be the same or different from each other.

In addition, during a synchronization period, a synchronization signal (first synchronization signal) is output simultaneously from the touch panel controller 4 to each of the drive lines $D_0$ to $D_n$. The synchronization signal is detected by the stylus pen 3, enabling the stylus pen 3 and the touch panel controller 4 to become synchronized.

Furthermore, during a touch and pen input detection period, the touch panel controller 4 drives each of the drive lines $D_0$ to $D_n$ while also detecting, via each of the sense lines $S_0$ to $S_m$, changes in the electrostatic capacitance due to touch.

Note that in the present embodiment, by driving the pen tip of the stylus pen 3 with the same waveform as that with which the touch panel controller 4 drives the drive line $D_{n+1}$, changing the electrostatic capacitance on the touchscreen of the touch panel 2, and detecting the change in the electrostatic capacitance via each of the sense lines $S_0$ to $S_m$, the touch panel controller 4 is able to detect additional information, such as the state of whether or not a button provided on the stylus pen 3 is being pressed by the user, or the pen pressure. Also, in the case of a waveform used for other than a drive line connected to a sensor, the waveform for driving the pen tip does not necessarily need to be $D_{n+1}$, and may also be $D_{n+2}$ or the like. For example, in the case of driving a sensor with the drive lines $D_1$ to $D_{n+1}$, the pen tip may be driven with the waveform corresponding to $D_0$, or the pen tip may be driven with the waveform of $D_{n+2}$ or thereafter.

Additionally, although discussed in detail later, the distance between the touch panel 2 and the stylus pen 3 may be computed by the touch panel controller 4 from changes in the electrostatic capacitance due to touch.

Figure 2:
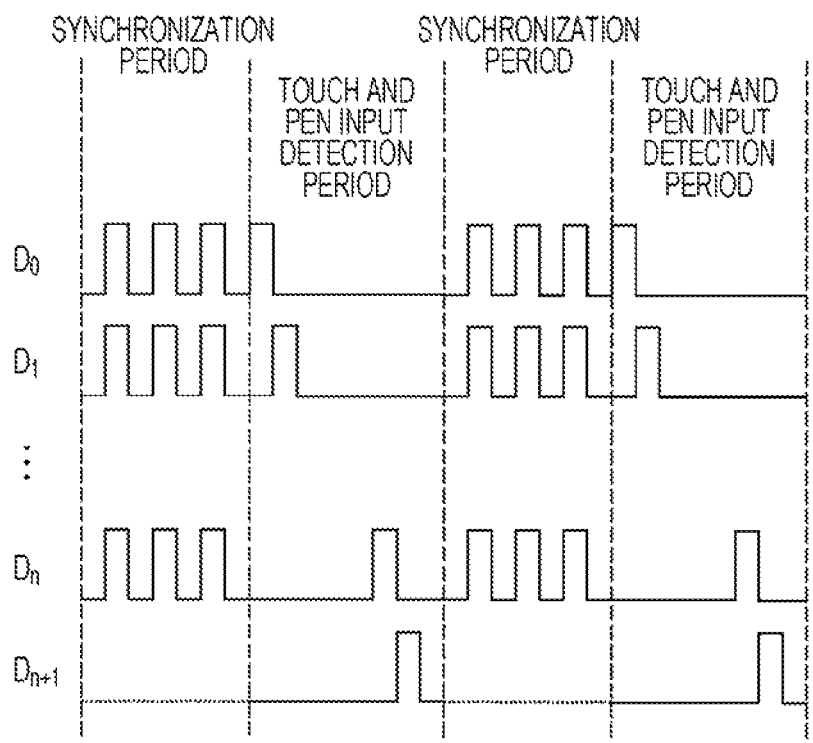
FIG. 2 is a diagram illustrating an example of signal waveforms output from a touch panel controller to drive lines $D_0$ to $D_n$ and a signal waveform corresponding to a drive line $D_{n+1}$ driven by a pen in the touch panel system according to Embodiment 1.

FIG. 2 is a diagram illustrating signal waveforms output from the touch panel controller 4 to the drive lines $D_0$ to $D_n$ and a signal waveform corresponding to the drive line $D_{n+1}$ that drives the pen tip of the stylus pen 3.

As illustrated in the drawing, during the synchronization period, the same synchronization (first synchronization signal) is output from the touch panel controller 4 to the drive lines $D_0$ to $D_n$, whereas during the touch and pen input detection period, a driving signal is output sequentially to the drive lines $D_0$ to $D_n$. In other words, during the touch and pen input detection period, at the timing when the driving signal of the drive line $D_{n-1}$ goes from high to low, the driving signal of the next drive line $D_n$ goes from low to high.

At the timing labeled $D_{n+1}$ in the drawing, the pen tip of the stylus pen 3 is driven to change the electrostatic capacitance on the touchscreen of the touch panel 2, and by detecting the change in the electrostatic capacitance via each of the sense lines $S_0$ to $S_m$, the touch panel controller 4 is able to detect additional information, such as the state of whether or not a button provided on the stylus pen 3 is being pressed by the user, or the pen pressure.

Note that in the present embodiment, as illustrated in the drawing, the case of sequential driving is described for the driving of the drive lines $D_0$ to $D_n$ and the driving of the pen tip using the signal waveform corresponding to $D_{n+1}$. However, an m-sequence, Hadamard code, or the like may also be used as a code sequence to implement parallel driving for the for driving of the drive lines $D_0$ to $D_n$ and the driving of the pen tip using the signal waveform corresponding to $D_{n+1}$. In the case of using parallel driving, the position of an object of detection may be detected from a correlation value computed by performing a correlation operation on the code sequence, or the position of an object of detection may be detected from a reconstructed value computed by performing a reconstruction operation on the code sequence.

In the case of implementing parallel driving for the driving of the drive lines $D_0$ to $D_n$ and the driving of the pen tip using the signal waveform corresponding to $D_{n+1}$, the sensing count (number of integrations) may be increased, and thus the S/N ratio may be improved, and a touch panel that detects position precisely may be realized.

(Configuration of Touch Panel)

Figure 3:
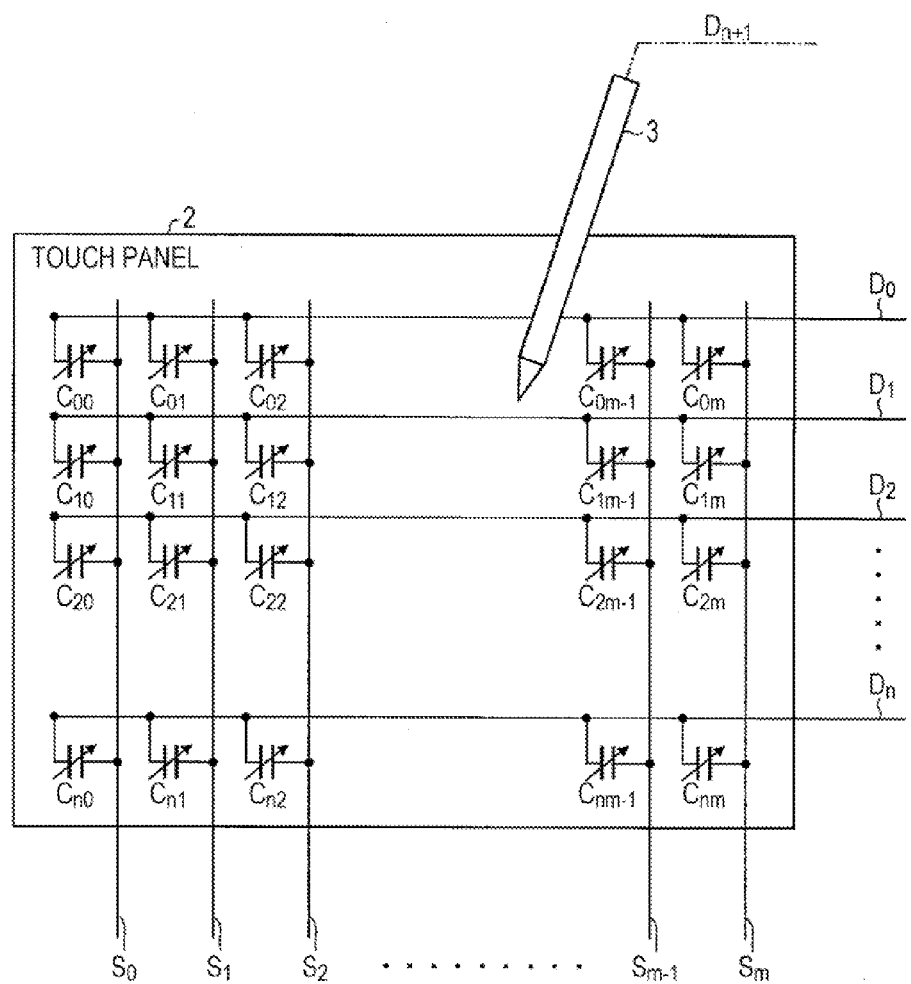
FIG. 3 is a diagram illustrating a schematic circuit configuration of a touch panel provided in the touch panel system according to Embodiment 1.

FIG. 3 is a diagram illustrating a schematic circuit configuration of the touch panel 2 provided in the touch panel system 1.

As illustrated in the drawing, multiple (a number n of) drive lines $D_0$ to $D_n$ extending parallel in the left-and-right direction of the drawing are provided, and multiple (a number m of) sense lines $S_0$ to $S_m$ extending parallel in the up-and-down direction of the drawing are provided so as to intersect with the drive lines $D_0$ to $D_n$. Additionally, at the locations where each of the above drive lines $D_0$ to $D_n$ intersects each of the above sense lines $S_0$ to $S_m$, electrostatic capacitances $C_{00}$ to $C_{nm}$ are provided. Note that m and n above may be the same or different from each other.

Subsequently, by coming close to the touchscreen of the touch panel 2, the stylus pen 3 detects the synchronization signal output from the touch panel controller 4 to each of the drive lines $D_0$ to $D_n$, and synchronizes with the touch panel controller 4.

Furthermore, during the touch and pen input detection period illustrated in FIG. 2, the touch panel controller 4 drives each of the drive lines $D_0$ to $D_n$ while also detecting, via each of the sense lines $S_0$ to $S_m$, changes in the electrostatic capacitance due to touch, and computes the touch position and/or the distance between the touch panel 2 and the stylus pen 3.

Note that in the present embodiment, by driving the pen tip of the stylus pen 3 with a waveform corresponding to the drive line $D_{n+1}$, changing the electrostatic capacitance on the touchscreen of the touch panel 2, and detecting the change in the electrostatic capacitance via each of the sense lines $S_0$ to $S_m$, the touch panel controller 4 is able to detect additional information, such as the state of whether or not a button provided on the stylus pen 3 is being pressed by the user, and the pen pressure.

(Stylus Pen Configuration and Pen Pressure Sensor Function)

The stylus pen 3 according to the present embodiment includes a pen pressure sensor for sensing the pen pressure, for example, and a pen pressure signal from the pen pressure sensor is output while synchronizing with the touch panel controller 4. However, the stylus pen 3 is not necessarily limited thereto, and may also not include the pen pressure sensor for sensing the pen pressure.

Figure 4:
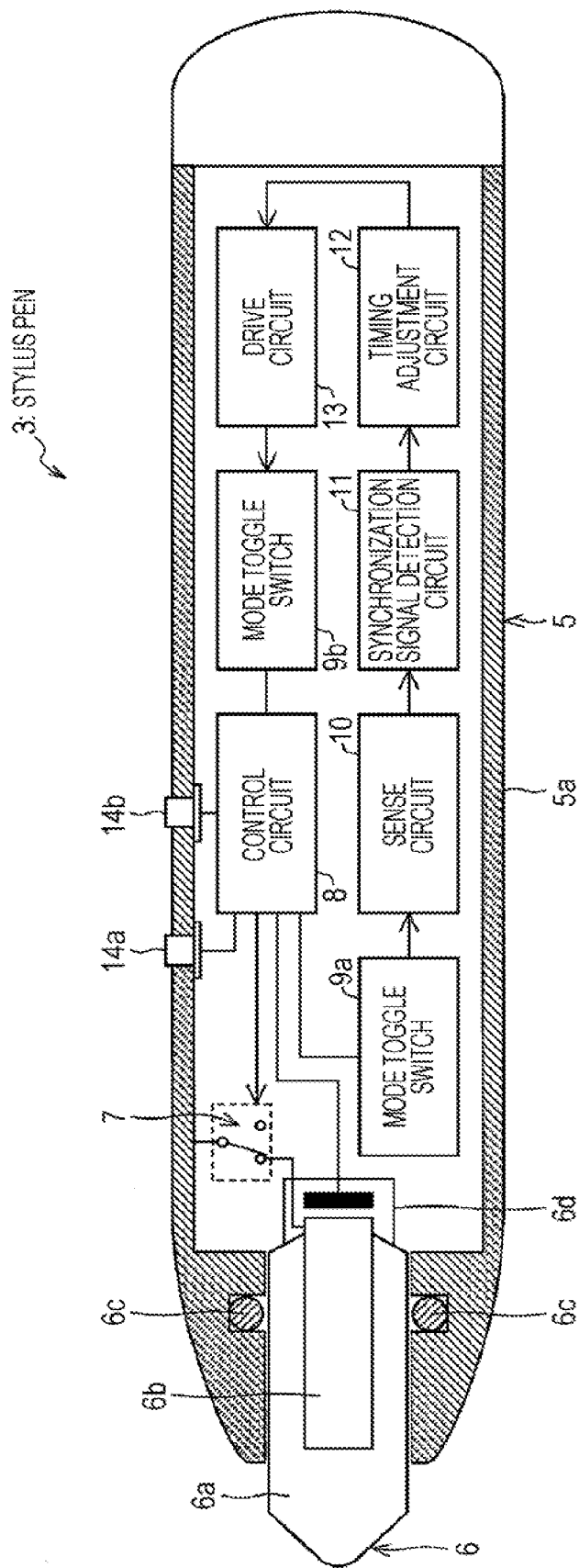
FIG. 4 is a diagram illustrating a schematic configuration of a stylus pen provided in the touch panel system according to Embodiment 1.

FIG. 4 is a cross-section diagram illustrating a configuration of the stylus pen 3.

As illustrated in FIG. 4, the stylus pen 3 includes a pen body 5, gripped by the user's hand, that includes a conductive grip portion 5a formed in an approximately cylindrical shape for being gripped by the user's hand. At the leading end of the pen body 5, there is provided a pen tip portion 6 that is pressed against the touch panel 2 during touch operations.

The pen tip portion 6 includes a pen tip cover 6a, pen tip shaft 6b, insulators 6c and 6c that retractably hold the pen tip cover 6a in the shaft direction, and a pen pressure sensor 6d provided on the interior side of the pen tip shaft 6b.

The pen tip cover 6a is made of an insulating material, while the pen tip shaft 6b is made of a conductive material, such as metal or a conductive polymer material, for example.

In addition, the pen pressure sensor 6d is made of a semiconductor piezoresistive pressure sensor, for example, in which a semiconductor strain gauge is formed on the surface of a diaphragm (not illustrated). Consequently, if the pen tip cover 6a of the pen tip portion 6 is pressed against the touch panel 2 during a touch operation, the pen tip shaft 6b is pushed inward via the pen tip cover 6a to press on the surface of the diaphragm of the pen pressure sensor 6d, and the resulting change in electrical resistance due to the piezoresistive effect produced by the deformation of the diaphragm is converted into an electrical signal. Consequently, the pen pressure of the stylus pen 3 may be detected. Furthermore, the basic principle of pen pressure detection is not necessarily limited to the above, and another detection principle may also be implemented.

Note that inside the pen body 5, a connection switch 7, a control circuit 8, mode toggle switches 9a and 9b, a sense circuit 10, synchronization signal detection circuit 11, a timing adjustment circuit 12, and a drive circuit 13 are provided. Furthermore, it is also possible to omit the connection switch 7. In the case of omitting the connection switch 7, the output of the control circuit 8 is connected to the pen tip shaft 6b.

The connection switch 7 is an electronic switch made up of a field-effect transistor (FET) or the like, and is controlled on and off by the control circuit 8. Herein, when the connection switch 7 is off, the pen tip cover 6a is electrically cut off from the grip portion 5a of the pen body 5. At this point, since the component capacitance of the pen tip portion 6 is extremely small, the touch panel system 1 does not recognize the proximity or contact of the stylus pen 3, even if the pen tip cover 6a is brought into the proximity of the touch panel 2.

On the other hand, when the connection switch 7 turns on, the pen tip cover 6a is electrically connected to the grip portion 5a of the pen body 5 via the pen tip shaft 6b, and the human body makes an electrical connection with the pen tip cover 6a via the grip portion 5a. Consequently, since the human body has a comparatively large electrostatic capacitance, if the stylus pen 3 comes into proximity with or contacts the touch panel 2, the electrical charge accumulated in each of the previously discussed electrostatic capacitances $C_{00}$ to $C_{nm}$ of the touch panel 2 changes, and the touch panel system 1 is able to detect the touch state of the stylus pen 3.

Additionally, the stylus pen 3 is provided with a first operating switch 14a and a second operating switch 14b of the push type, for example. By pushing the first operating switch 14a and the second operating switch 14b, a function assigned to each of the first operating switch 14a and the second operating switch 14b is made to be executed via the control circuit 8. The function assigned to the first operating switch 14a may be an eraser function, for example, enabling the eraser function to be turned on and off with the first operating switch 14a. Also, the function assigned to the second operating switch 14b may be a mouse right-click function, for example, enabling the mouse right-click function to be turned on and off with the second operating switch 14b.

Furthermore, the eraser function and the mouse right-click function are examples, and the assigned functions are not limited to the eraser function and the mouse right-click function. Also, other additional operating switches may be provided to enable the addition of other functions.

Note that the touch position of the stylus pen 3 on the touch panel 2 is detected as a result of the touching the stylus pen 3 to the touch panel 2 while the connection switch 7 of the stylus pen 3 is turned on.

In the present embodiment, in order for the touch panel controller 4 to detect the driving of the pen tip portion 6 in the stylus pen 3, the pen tip of the stylus pen 3 is driven with a waveform corresponding to the drive line $D_{n+1}$ or the like to change the electrostatic capacitance on the touchscreen of the touch panel 2, and by detecting the change in the electrostatic capacitance via each of the sense lines $S_0$ to $S_m$, the touch panel controller 4 is able to detect additional information, such as the state of whether or not a button provided on the stylus pen 3 is being pressed by the user, and the pen pressure.

(Basic Operation of Synchronization Between Touch Panel Controller and Stylus Pen)

Meanwhile, the stylus pen 3 according to the present embodiment wirelessly transmits and receives signals to and from the touch panel controller 4. Consequently, the pen tip portion 6 is driven with the same pattern as that which drives the virtual drive line $D_{n+1}$, so as to be compatible with the drive timings of the drive lines $D_0$ to $D_n$ in the touch panel controller 4. Accordingly, in the stylus pen 3, the drive circuit 13 is provided to perform driving similarly to the driver of the touch panel controller 4.

Figure 6:
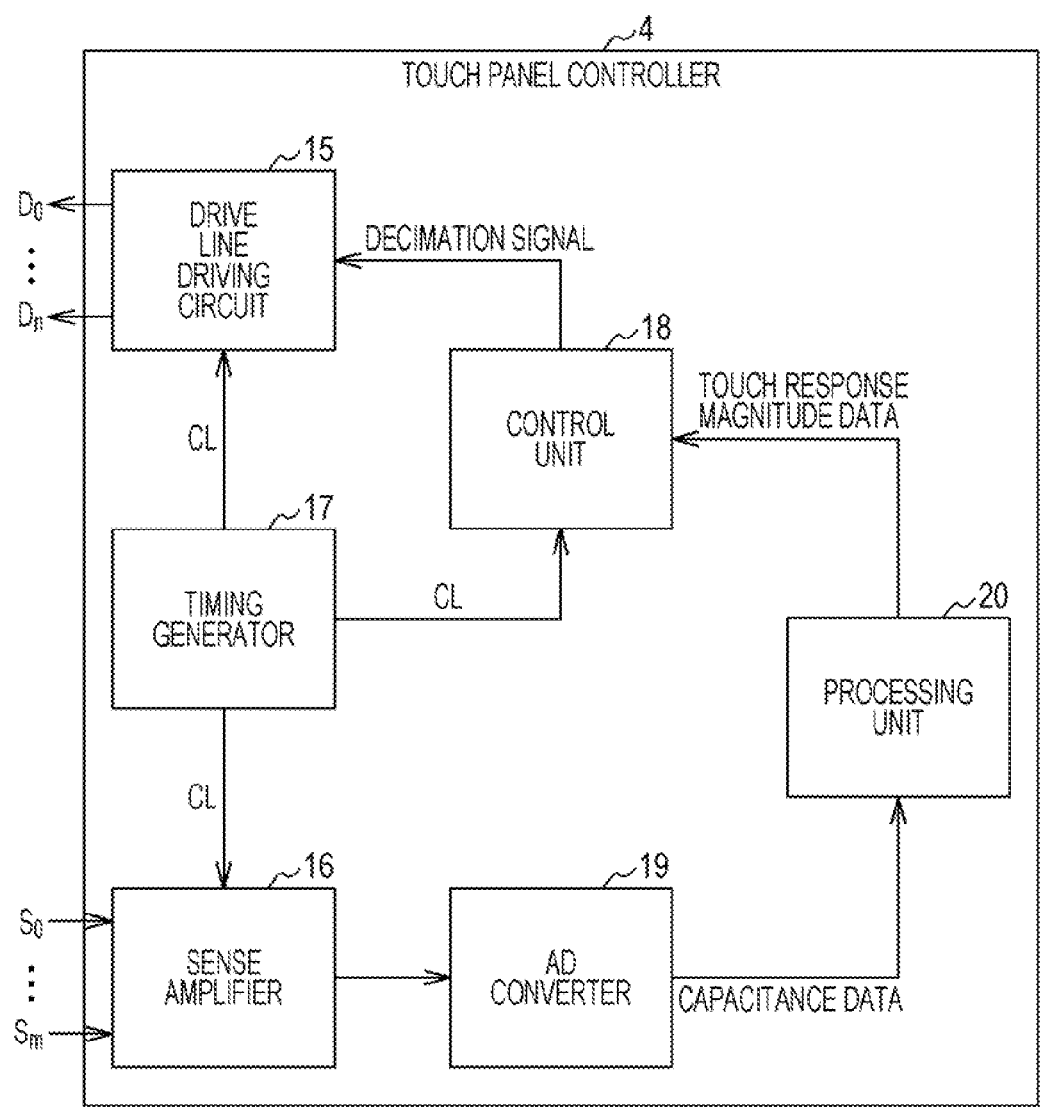
FIG. 6 is a diagram illustrating a schematic configuration of a touch panel controller provided in the touch panel system according to Embodiment 1.

The driving of the drive lines $D_0$ to $D_n$ in the touch panel controller 4 is based on drive timings generated by a timing generator 17 (FIG. 6). For this reason, the stylus pen 3 must also be made to operate in synchronization with the timings driven by the touch panel controller 4. Accordingly, in the stylus pen 3 according to the present embodiment, by providing the sense circuit 10, the synchronization signal detection circuit 11, and the timing adjustment circuit 12, a dedicated synchronization signal driven by the touch panel controller 4 is detected by the stylus pen 3, and the timings of the synchronization signal from the touch panel controller 4 and the timings of a pen synchronization signal produced by the timing adjustment circuit 12 in the stylus pen 3 are aligned.

The stylus pen 3 uses the sense circuit 10 and the synchronization signal detection circuit 11 to detect the dedicated synchronization signal produced by the timing generator 17 (FIG. 6) of the touch panel controller 4.

Note that the driving operation of the stylus pen 3 is made up of the repetition of three periods: a synchronization signal detection period in which the mode toggle switch 9a is turned on, the mode toggle switch 9b is turned off, and the synchronization signal from the touch panel controller 4 is detected by the sense circuit 10 and the synchronization signal detection circuit 11; a preparatory period; and a drive mode period in which the mode toggle switch 9a is turned off, the mode toggle switch 9b is turned on, and the pen tip portion 6 is driven by the drive circuit 13.

The synchronization signal detection period is a standby period for detecting a bit pattern expressing a synchronization waveform, and is a period that cuts the drive of the pen tip portion 6, and detects the synchronization signal pattern from the pen tip signal waveform.

The preparatory period is a preparatory period for starting to drive the pen tip at timings in alignment with the touch panel controller 4 after the synchronization signal pattern is detected, and is a period that interprets additional information that takes timings at the start of driving.

The drive mode period is a period that drives the pen tip portion 6 with the drive circuit 13, and is a period that drives the pen tip portion 6 in alignment with the drive timings of the touch panel controller 4, while also making fine adjustments to the edges of the driving waveform. At this point, the drive circuit 13 of the stylus pen 3 is driven in alignment with the drive timings of the touch panel controller 4.

Figure 5:
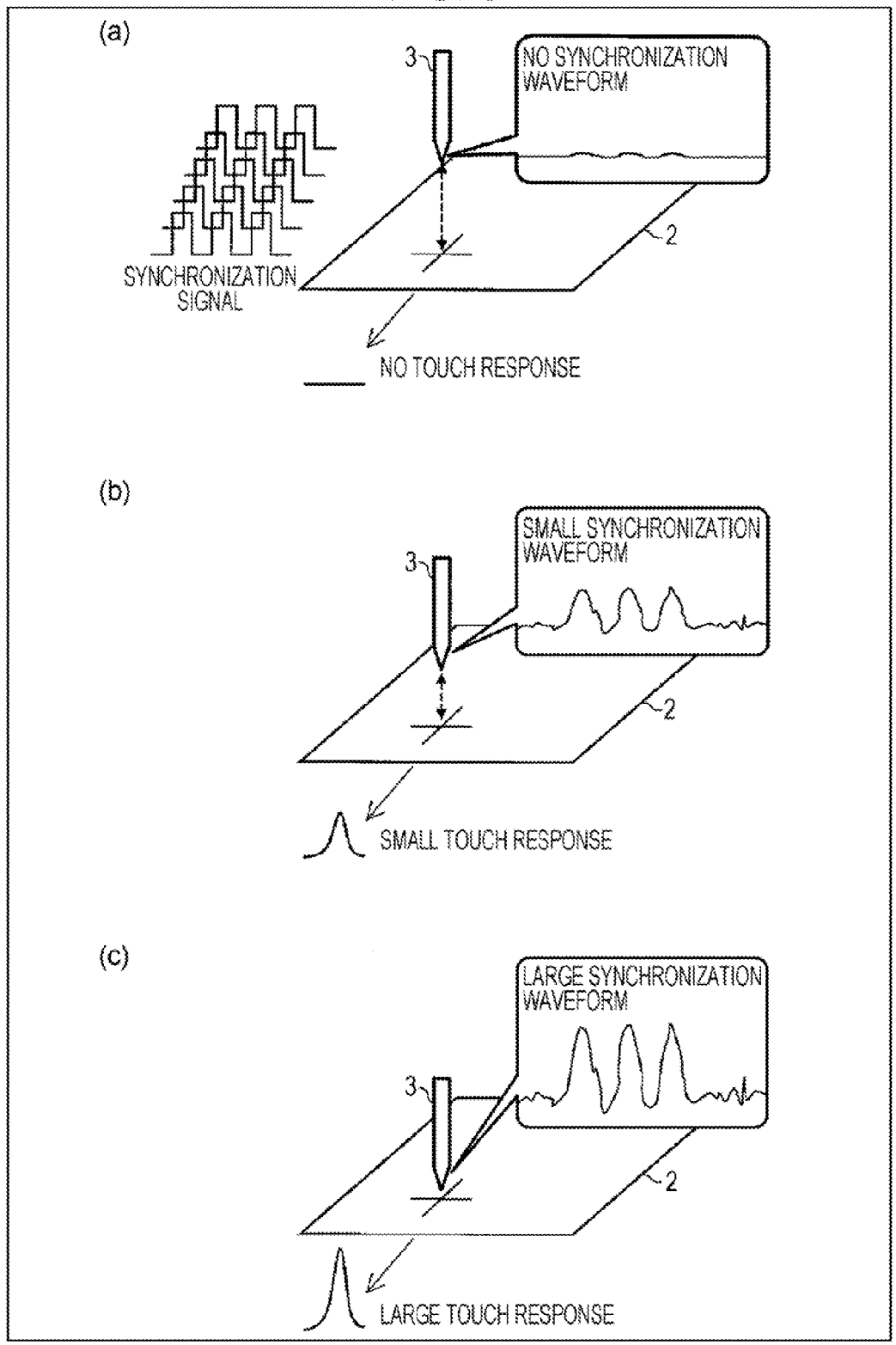
FIG. 5 is a diagram illustrating a correspondence relationship between the magnitude of touch response detected by a touch panel controller and the magnitude of the amplitude of a synchronization waveform detected internally in a stylus pen provided in the touch panel system according to Embodiment 1.

FIG. 5 is a diagram illustrating a correspondence relationship between the magnitude of the synchronization signal detected by the stylus pen 3, and the magnitude of the touch response of the stylus pen 3 on the touch panel 2 detected by the touch panel controller 4.

FIG. 5(a) is a diagram illustrating a case in which the touchscreen of the touch panel 2 and the stylus pen 3 are comparatively far apart. In such cases, the waveform of the synchronization signal is scarcely detected by the stylus pen 3. Additionally, the magnitude of the touch response of the stylus pen 3 on the touch panel 2 detected by the touch panel controller 4 is determined to be no touch response, since the touchscreen of the touch panel 2 and the stylus pen 3 are comparatively far apart.

FIG. 5(b) is a diagram illustrating a case in which the touchscreen of the touch panel 2 and the stylus pen 3 are comparatively close. In such cases, a small waveform of the synchronization signal is detected by the stylus pen 3. Additionally, the magnitude of the touch response of the stylus pen 3 on the touch panel 2 detected by the touch panel controller 4 is determined to be a small touch response, since the touchscreen of the touch panel 2 and the stylus pen 3 are comparatively close.

FIG. 5(c) is a diagram illustrating a case in which the touchscreen of the touch panel 2 and the stylus pen 3 are in contact. In such cases, a large waveform of the synchronization signal is detected by the stylus pen 3. Additionally, the magnitude of the touch response of the stylus pen 3 on the touch panel 2 detected by the touch panel controller 4 is determined to be a large touch response, since the touchscreen of the touch panel 2 and the stylus pen 3 are in contact.

Note that the magnitude of the touch response of the stylus pen 3 on the touch panel 2 detected by the touch panel controller 4, or in other words, the distance between the touch panel 2 and the stylus pen 3 is computed during the touch and pen input detection period illustrated in FIG. 2 by driving each of the drive lines $D_0$ to $D_n$ while also detecting, via each of the sense lines $S_0$ to $S_m$, changes in the electrostatic capacitance due to touch.

FIG. 6 is a diagram illustrating a schematic configuration of the touch panel controller 4 provided in the touch panel system 1.

As illustrated in the drawing, the touch panel controller 4 is equipped with a drive line driving circuit 15, a sense amplifier 16, a timing generator 17, a control unit 18, an AD converter 19, and a processing unit 20.

The drive line driving circuit 15 is a circuit that outputs a synchronization signal generated on the basis of a clock signal CL generated by the timing generator 17, and a driving signal, to each of the drive lines $D_0$ to $D_n$.

The sense amplifier 16 is a circuit that acquires capacitance data via each of the sense lines $S_0$ to $S_m$ on the basis of the clock signal CL generated by the timing generator 17, and the above driving signal, and sends the acquired capacitance data to the AD converter 19.

In the timing generator 17, the clock signal CL and a synchronization based on the clock signal CL are generated and sent to the drive line driving circuit 15, the sense amplifier 16, the control unit 18, and the like.

Note that the AD converter 19 is configured to convert the capacitance data into digital data, and then send the digital data to the processing unit 20.

Additionally, the processing unit 20 detects, from the capacitance data, information related to the touch position, information convertible into the magnitude of the touch response of the stylus pen 3 on the touch panel 2, or in other words, the distance between the touch panel 2 and the stylus pen 3, and additional information such as whether or not a button provided on the stylus pen 3 is being pressed by the user, and the pen pressure.

Also, the control unit 18 decides whether or not to output a decimation signal to the drive line driving circuit 15, on the basis of the touch response magnitude data (information about the distance between the touch panel 2 and the stylus pen 3). In other words, if the touch response magnitude data is a designated value or greater, a decimation signal is output, whereas if the touch response magnitude is less than a designated value, a signal is output without being decimated.

Consequently, when the touch response magnitude data is the designated value or greater, or in other words, when the distance between the touch panel 2 and the stylus pen 3 are closer than a designated value, a new, decimated synchronization (second synchronization signal) is output from the drive line driving circuit 15.

Also, in the processing unit 20, processing corresponding to a determined input operation is performed on the basis of capacitance data regarding the touch position, touch response magnitude data, and additional information.

Figure 7:
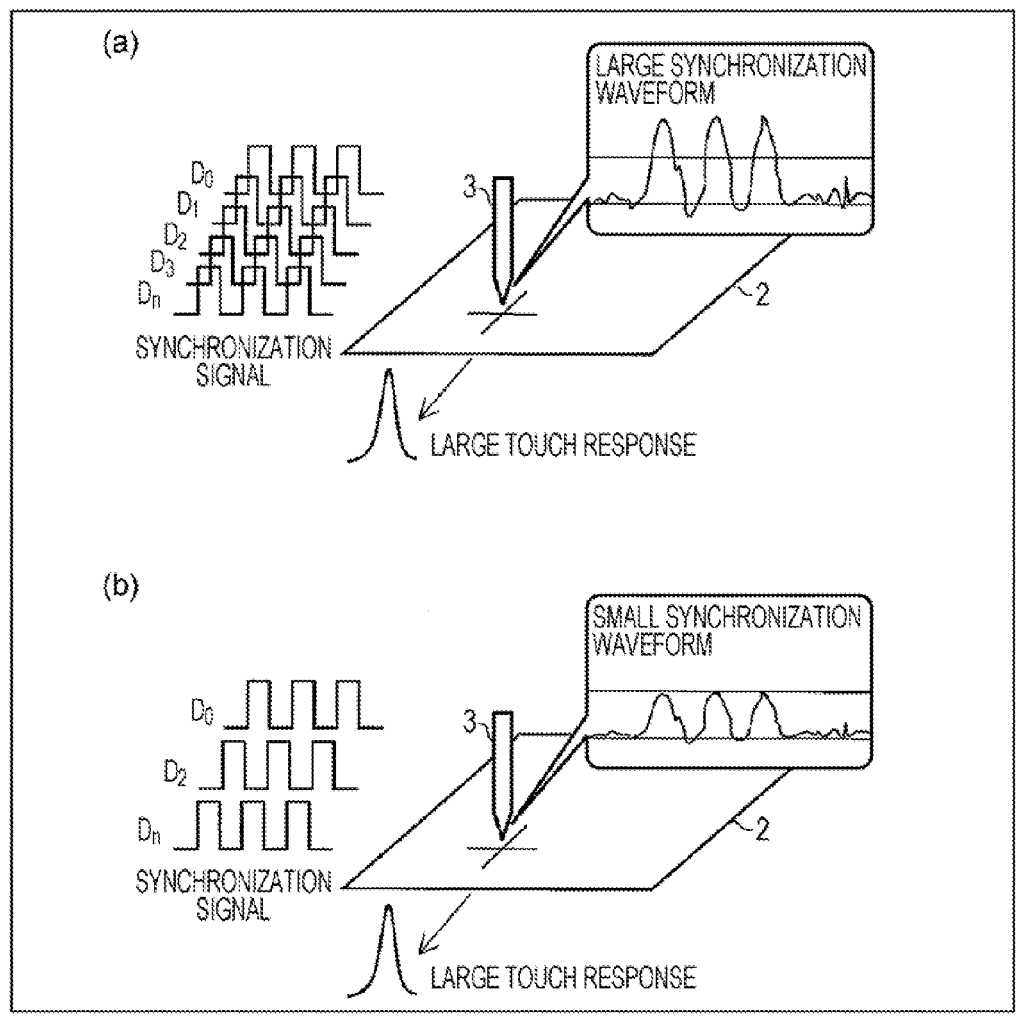
FIG. 7 is a diagram for explaining the cases of conducting and not conducting signal output decimation in a touch panel controller provided in the touch panel system according to Embodiment 1.

FIG. 7 is a diagram for explaining the cases of conducting and not conducting decimation of the synchronization signal output decimation in the control unit of the touch panel controller 4 provided in the touch panel system 1.

FIG. 7(a) is the case of outputting without decimating in the control unit 18. In such cases, the synchronization signal is output to all of the drive lines $D_0$ to $D_n$, and when the touchscreen of the touch panel 2 and the stylus pen 3 are in contact, a large waveform of the synchronization signal is detected by the stylus pen 3.

On the other hand, FIG. 7(b) is the case of the control unit 18 outputting a decimation signal. In such cases, the synchronization is output only to designated drive lines determined in advance. In the present embodiment, the synchronization is output only to the drive lines on even-numbered rows from among the drive lines $D_0$ to $D_n$. For this reason, even in the case in which the touchscreen of the touch panel 2 and the stylus pen 3 are in contact, the waveform of the synchronization detected by the stylus pen 3 becomes comparatively small. However, even such a comparatively small waveform of the synchronization still exceeds a designated reference value, and thus is detectable by the sense circuit 10 and the synchronization signal detection circuit 11 of the stylus pen 3.

Note that in the present embodiment, the synchronization signal is configured to be output only to the drive lines on even-numbered rows from among the drive lines $D_0$ to $D_n$, but is not limited thereto. The synchronization signal may also be output only to the drive lines on odd-numbered rows. Furthermore, drive lines may also be decimated according to an arbitrary ratio, such as decimating J out of I lines (where I>J), irrespectively of position on the touchscreen of the touch panel 2, insofar as the stylus pen 3 is able to detect the synchronization signal at a designated strength or greater.

Figure 8:
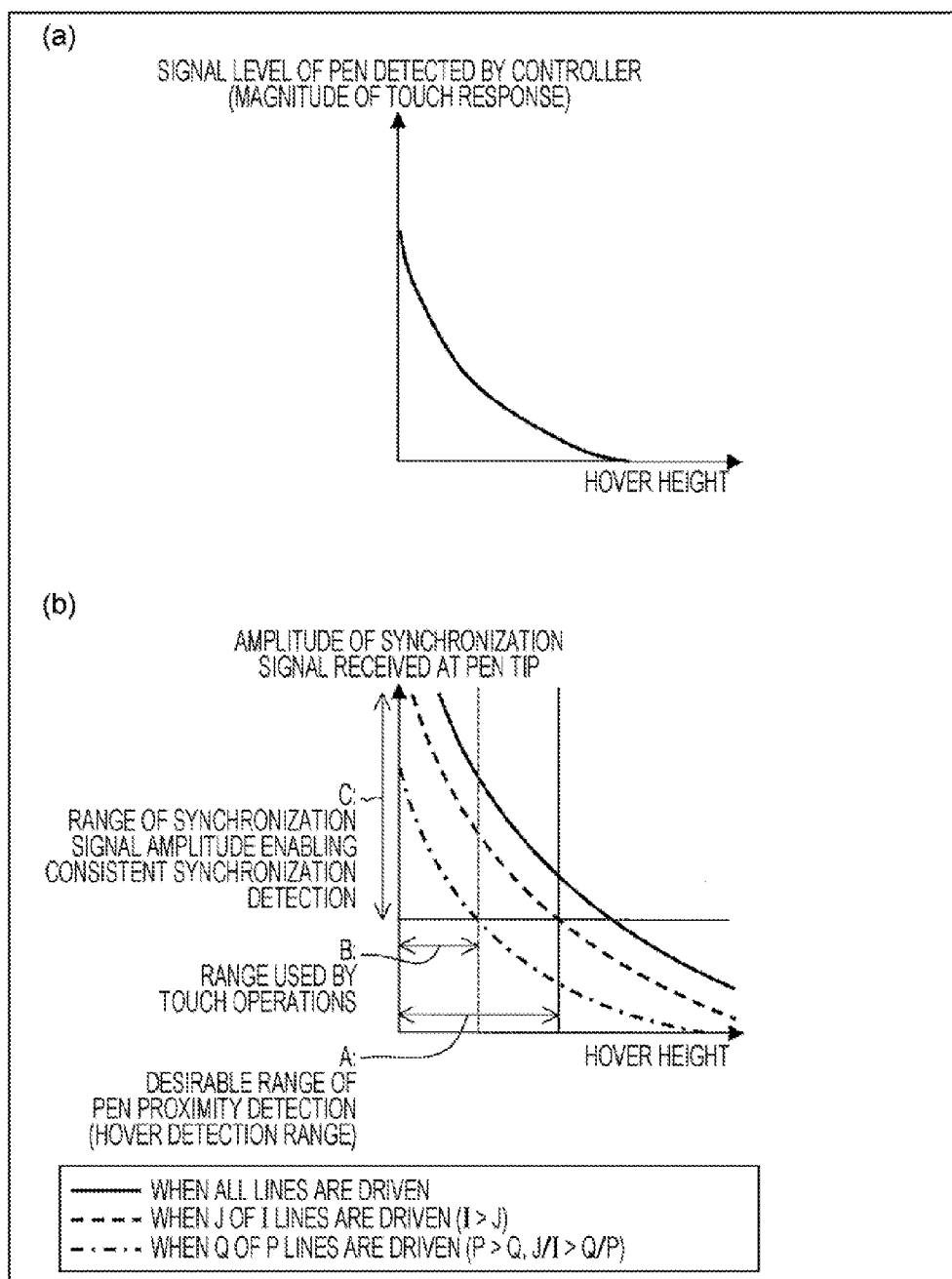
FIG. 8 is a diagram for explaining, in the case of outputting a decimation signal, how many drive lines may be decimated from among the drive lines $D_0$ to $D_n$ in a control unit of a touch panel controller provided in the touch panel system according to Embodiment 1.

FIG. 8 is a diagram for explaining, in the case of the control unit 18 outputting a decimation signal, how many drive lines may be decimated from among the drive lines $D_0$ to $D_n$.

FIG. 8(a) is a diagram illustrating the relationship between touch response magnitude data detected on the basis of the touch panel controller 4 driving each of the drive lines $D_0$ to $D_n$ while also detecting, via each of the sense lines $S_0$ to $S_m$, changes in the electrostatic capacitance due to touch, and the hover height (distance between the stylus pen 3 and the touch panel 2).

The touch response magnitude data detected by the touch panel controller 4 and the hover height (distance between the stylus pen 3 and the touch panel 2) are associated, as illustrated in the drawing.

FIG. 8(b) is a diagram illustrating the relationship between the amplitude of the synchronization signal received at the pen tip of the stylus pen 3 and the hover height (distance between the stylus pen 3 and the touch panel 2), and shows a trend in which the hover height at which the synchronization signal is detectable becomes lower as the number of lines to which the synchronization signal is output from among the drive lines $D_0$ to $D_n$ decreases.

The following describes how many drives lines may be decimated from among the drive lines $D_0$ to $D_n$, based on FIG. 8(b).

First, a desired detection range of the proximity of the stylus pen 3 (hover detection range) A and a range B to be used for touch operations are decided.

Subsequently, a range C of synchronization signal amplitudes at which consistent synchronization detection is possible is computed from the performance of the touch panel system 1.

Next, from the desired detection range of the proximity of the stylus pen 3 (hover detection range) A and the range C of synchronization signal amplitudes at which consistent synchronization detection is possible, and from the range B to be used for touch operations and the range C of synchronization signal amplitudes at which consistent synchronization detection is possible in the drawing, it is possible to decide how many drive lines to decimate from among the drive lines $D_0$ to $D_n$ to which the synchronization signal is output.

In other words, a minimum number of lines to decimate may be decided from the range A and the range C in the drawing, while a maximum number of lines to decimate may be decided from the range B and the range C in the drawing.

In the control unit 18 provided in the touch panel controller 4, the number of lines to decimate is decided from data regarding the hover height (distance between the stylus pen 3 and the touch panel 2) and the touch response magnitude data, and the decimation signal is output to the drive line driving circuit 15 (see FIG. 6).

If the hover height (distance between the stylus pen 3 and the touch panel 2) is within the range B to be used for touch operations, a decimation signal causing only Q out of P drive lines to be driven is output to the drive line driving circuit 15.

On the other hand, if the hover height (distance between the stylus pen 3 and the touch panel 2) is equal to or greater than the range B to be used for touch operations, but less than the desired detection range of the proximity of the stylus pen 3 (hover detection range) A, a decimation signal causing only J out of I drive lines to be driven is output to the drive line driving circuit 15.

Also, if the hover height (distance between the stylus pen 3 and the touch panel 2) is equal to or greater than the desired detection range of the proximity of the stylus pen 3 (hover detection range) A, a decimation signal causing all drive lines to be driven is output to the drive line driving circuit 15.

By using such a configuration, it is possible to realize a touch panel system 1 able to moderate the amount of power consumed when synchronizing drive timings between the stylus pen 3 and the touch panel controller 4 that drives the touch panel 2 while also keeping the stylus pen 3 and the touch panel controller 4 consistently synchronized, and thereby operate with low power consumption.

Note that since I, J, P, and Q in FIG. 8(b) are all values related to the drive lines $D_0$ to $D_n$ in the present embodiment, I≤n, J≤n, I>J, and P>Q hold true, and from the relationships of signal strength, P/Q>I/J holds true.

Note that a configuration that arbitrarily changes the number of drive lines to which to output the synchronization signal from J out of I lines up to Q out of P lines according to the hover height (distance between the stylus pen 3 and the touch panel 2) may be realized by using a function or a look-up table.

Embodiment 2

Next, Embodiment 2 of the present invention will be described on the basis of FIGS. 9 and 10. The touch panel controller 4a of the touch panel system according to the present embodiment differs from the above Embodiment 1 by being provided with a control unit 18a that decides, on the basis of a magnitude of touch response and coordinate data from the processing unit 20, which region of drive lines to decimate from among the drive lines $D_0$ to $D_n$. Otherwise, the configuration is as described in Embodiment 1. For the sake of convenience, members having the same function as the members illustrated in the drawings of the above Embodiment 1 are given the same signs, and description thereof will be reduced or omitted.

Figure 9:
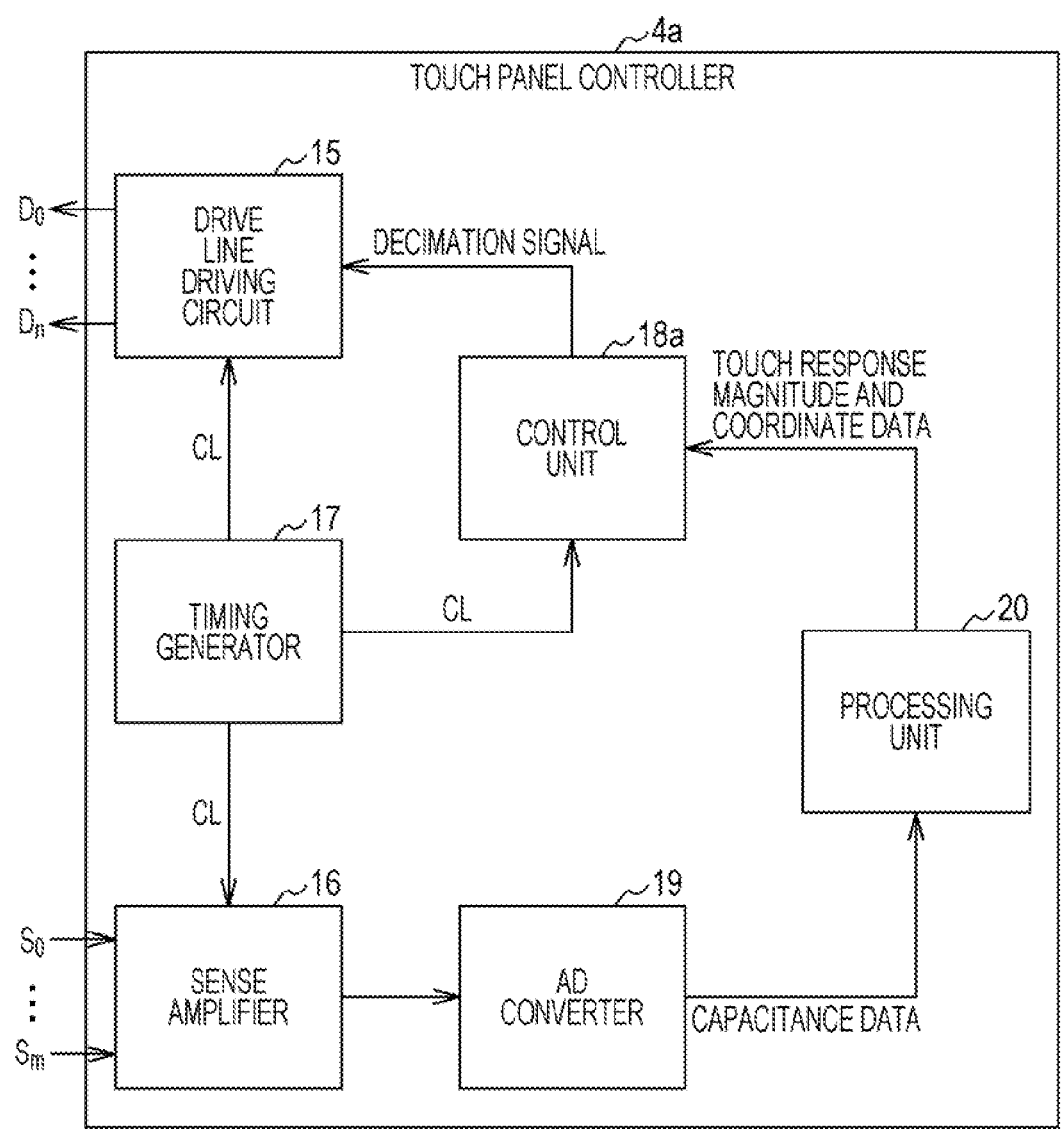
FIG. 9 is a diagram illustrating a schematic configuration of a touch panel controller provided in the touch panel system according to Embodiment 2.
Figure 10:
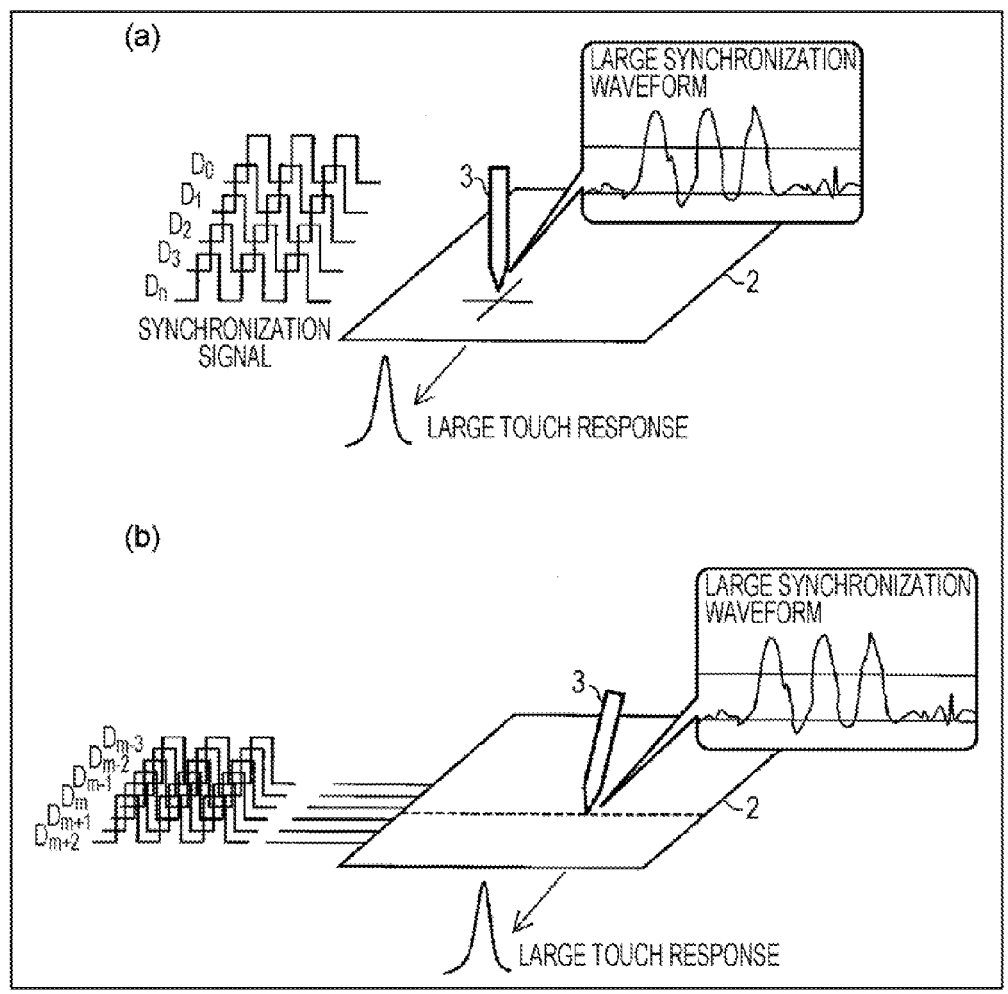

FIG. 9 is a diagram illustrating a schematic configuration of the touch panel controller 4a provided in the touch panel system according to the present embodiment.

As illustrated in the drawing, the control unit 18a provided in the touch panel controller 4a receives, from the processing unit 20, touch response magnitude data (the distance between the stylus pen 3 and the touch panel 2) detected from changes in the electrostatic capacitance due to touch.

Subsequently, if the magnitude of the touch response is enough to detect the touch coordinates, the control unit 18a also receives touch coordinate data received from the processing unit 20, and outputs to the drive line driving circuit 15 a decimation signal causing the output of a synchronization signal only to the drive lines in a region neighboring the touch coordinate data from among the drive lines $D_0$ to $D_n$.

FIG. 10(a) illustrates the case of outputting the synchronization signal to all drives lines $D_0$ to $D_n$, while FIG. 10(b) is a diagram illustrating the case of outputting the synchronization signal only to the drive lines in a region neighboring the touch coordinates from among the drive lines $D_0$ to $D_n$.

The following describes in detail how many drive lines centered on the touch coordinates from among the drive lines $D_0$ to $D_n$ are sufficient to output the synchronization signal to.

First, regarding the movement of the stylus pen 3, the speed up to which movement of the touch position should be tracked is decided on the basis of the specifications of the touch panel system.

Next, based on the periodicity of the synchronization period and the above speed, the number of drive lines $D_0$ to $D_n$ across which the stylus pen 3 may possibly move until the next synchronization period is computed.

Described in terms of a specific example, suppose that the synchronization period is 1 ms, the touch and pen input detection period is 9 ms (see FIG. 2), the movement speed of the stylus pen 3 is 1000 mm/s (the maximum movement speed of the stylus pen 3 to be supported, based on the specifications of the touch panel system), and the pitch of the drive lines $D_0$ to $D_n$ is 5 mm. In this case, from the initially detected touch coordinates of the stylus pen 3, the next touch coordinates detected 10 ms later may possibly have moved across two of the drive lines $D_0$ to $D_n$.

Consequently, as illustrated in FIG. 10(b), when the initially detected touch coordinates of the stylus pen 3 are between a drive line $D_{m-1}$ and a drive line $D_m$, it is sufficient to output the synchronization signal only to the six lines from the drive line $D_{m-3}$ to the drive line $D_{m+2}$.

By using such a configuration, it is possible to realize a touch panel system able to moderate the amount of power consumed when synchronizing drive timings between the stylus pen 3 and the touch panel controller 4a that drives the touch panel 2 while also keeping the stylus pen 3 and the touch panel controller 4a consistently synchronized, and thereby operate with low power consumption.

Note that since the configuration according to the present embodiment may be used when the stylus pen 3 approaches the touchscreen of the touch panel 2 enough to detect the touch coordinates, the configuration may also be combined with Embodiment 1 discussed earlier, and also used in a configuration that changes the number of drive lines to which to output the synchronization signal in multiple stages as the stage having the smallest number of drive lines to which to output the synchronization signal.

Embodiment 3

Next, Embodiment 3 of the present invention will be described on the basis of FIGS. 11 and 12. The touch panel controller 4b of the touch panel system according to the present embodiment differs from the above Embodiments 1 and 2 by being equipped with a control unit 18b that adjusts the voltage of the synchronization signal. Otherwise, the configuration is as described in Embodiments 1 and 2. For the sake of convenience, members having the same function as the members illustrated in the drawings of the above Embodiments 1 and 2 are given the same signs, and description thereof will be reduced or omitted.

Figure 11:
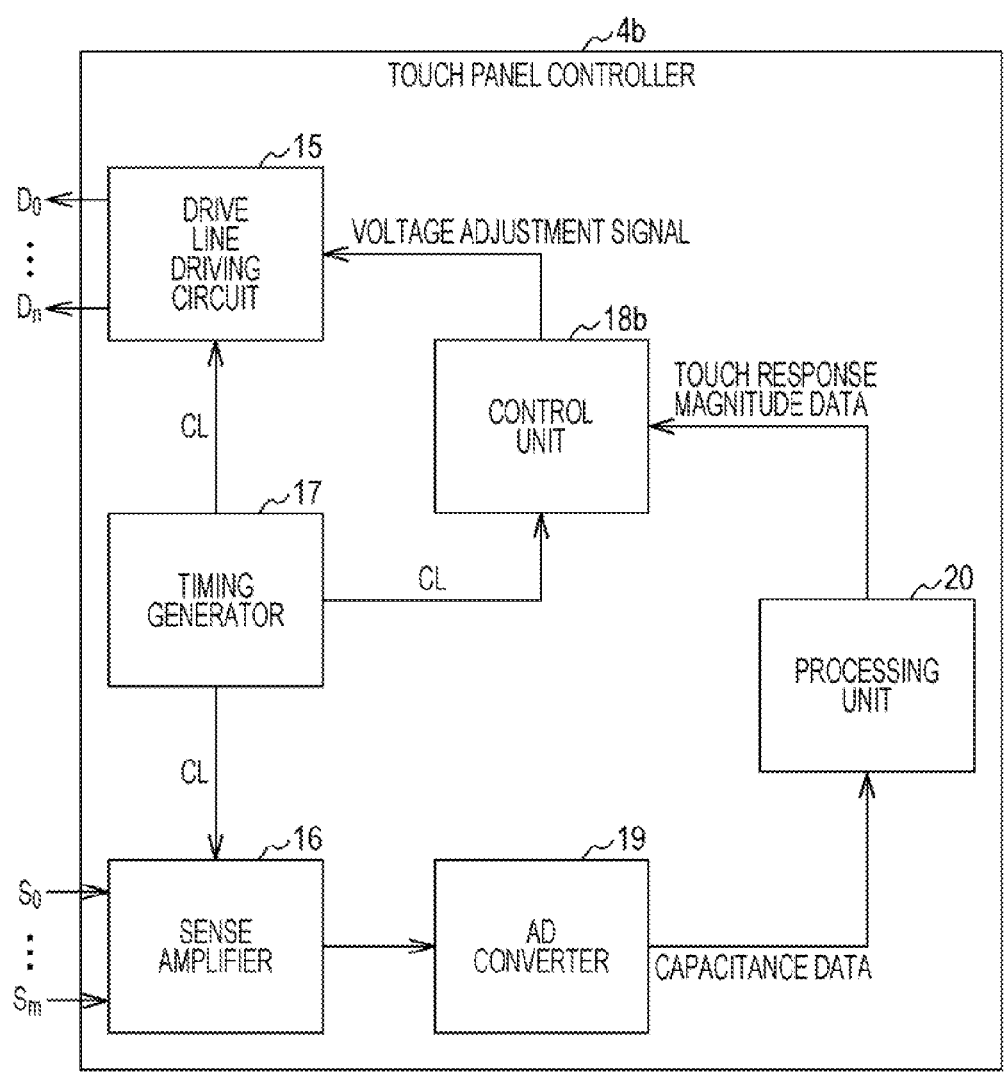
FIG. 11 is a diagram illustrating a schematic configuration of a touch panel controller provided in the touch panel system according to Embodiment 3.
Figure 12:
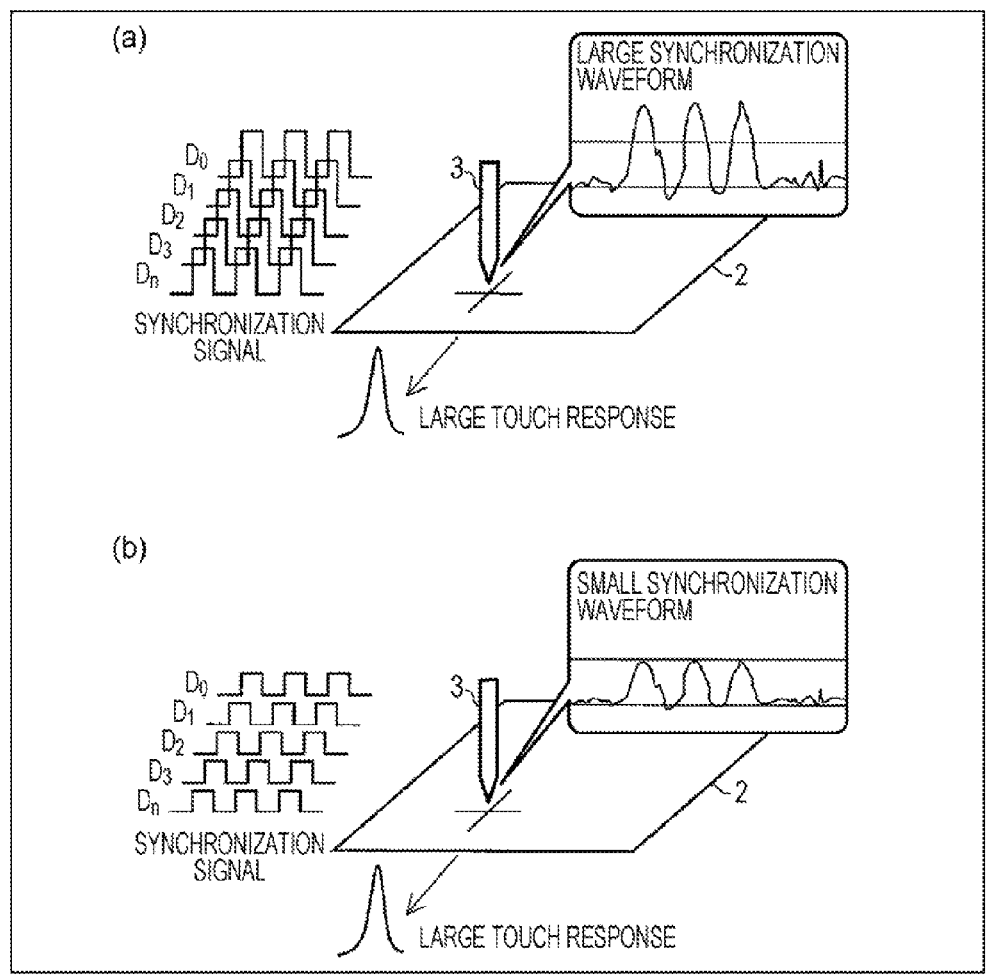

FIG. 11 is a diagram illustrating a schematic configuration of the touch panel controller 4b provided in the touch panel system according to the present embodiment.

As illustrated in the drawing, the control unit 18b provided in the touch panel controller 4b receives, from the processing unit 20, touch response magnitude data (the distance between the stylus pen 3 and the touch panel 2) detected from changes in the electrostatic capacitance due to touch, and outputs to the drive line driving circuit 15 a voltage adjustment signal for adjusting the voltage of the synchronization signal according to the magnitude of the touch response.

FIG. 12(a) illustrates the case of outputting a synchronization signal with a comparatively high voltage value when risen to all drives lines $D_0$ to $D_n$, while FIG. 12(b) is a diagram illustrating the case of outputting a synchronization signal with a comparatively low voltage value when risen to all drive lines $D_0$ to $D_n$.

As illustrated in the drawing, in the case of FIG. 12(b), the magnitude of the waveform of the synchronization signal sensed by the stylus pen 3, although small compared to the case of FIG. 12(a), exceeds a designated reference value.

As above, by lowering the voltage value of the synchronization signal within a range that still allows for consistent synchronization between the stylus pen 3 and the touch panel controller 4b, and outputting a synchronization signal with a comparatively low voltage value when risen (when the signal goes high), it is possible to realize a touch panel system 1 able to moderate the amount of power consumed when synchronizing drive timings between the stylus pen 3 and the touch panel controller 4b that drives the touch panel 2 while also keeping the stylus pen 3 and the touch panel controller 4b consistently synchronized, and thereby operate with low power consumption.

Note that the configuration according to the present embodiment may also be used in combination with Embodiments 1 and 2 discussed earlier. Furthermore, if the number of drive lines to drive in FIG. 8(b) of Embodiment 1 is treated as the magnitude of the voltage value of the synchronization signal, a new relationship between the amplitude of the synchronization signal received at the pen tip of the stylus pen 3 and the hover height (distance between the stylus pen 3 and the touch panel 2) may be computed, and the voltage value of the synchronization signal may be lowered in multiple stages according to the touch response magnitude data (distance between the stylus pen 3 and the touch panel 2).

Embodiment 4

Next, Embodiment 4 of the present invention will be described on the basis of FIGS. 13 and 14. The touch panel controller 4c of the touch panel system according to the present embodiment differs from the above Embodiments 1 to 3 by being equipped with a control unit 18c that outputs a synchronization signal drive pattern select signal. Otherwise, the configuration is as described in Embodiments 1 to 3. For the sake of convenience, members having the same function as the members illustrated in the drawings of the above Embodiments 1 to 3 are given the same signs, and description thereof will be reduced or omitted.

Figure 13:
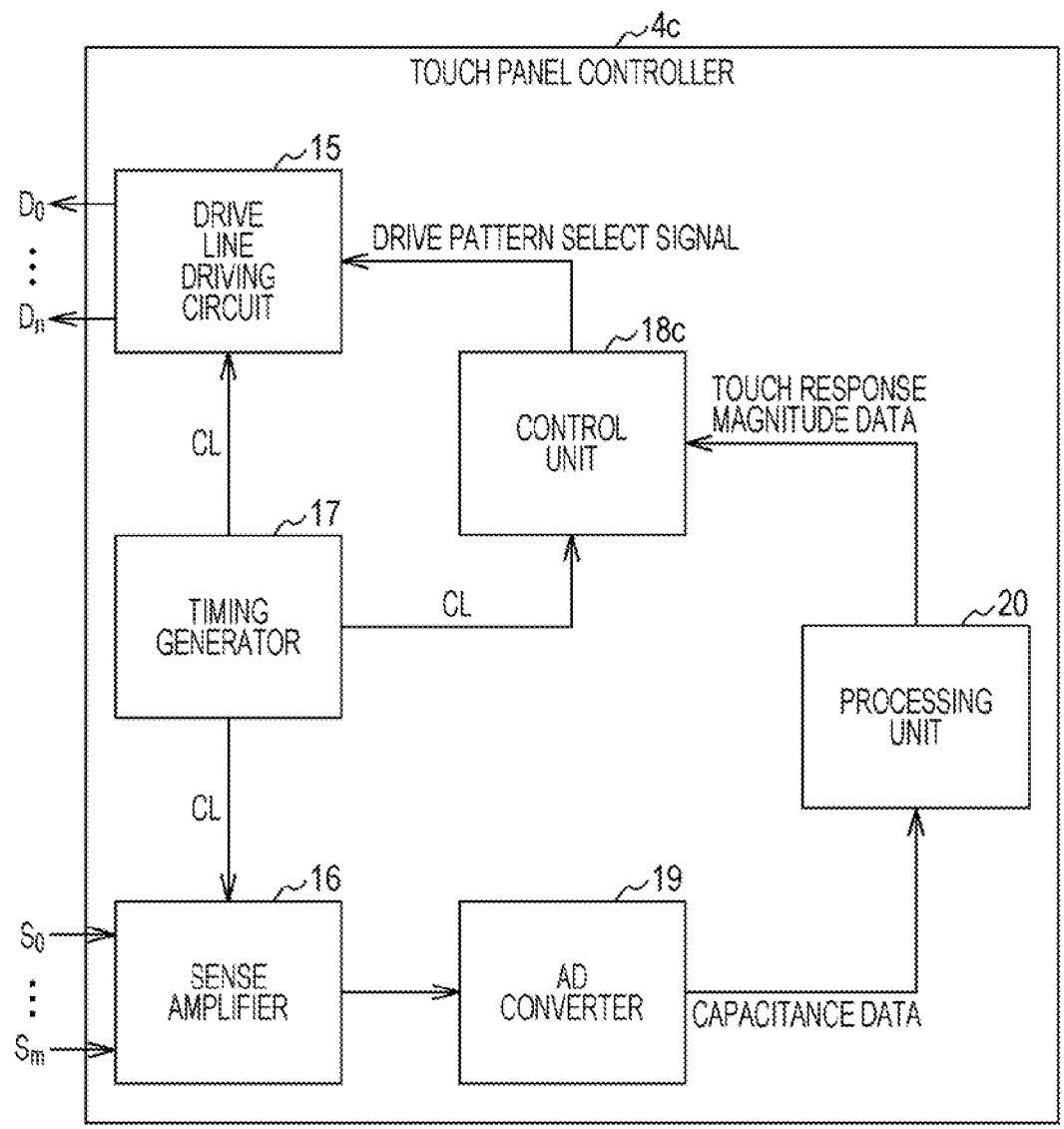
FIG. 13 is a diagram illustrating a schematic configuration of a touch panel controller provided in the touch panel system according to Embodiment 4.
Figure 14:
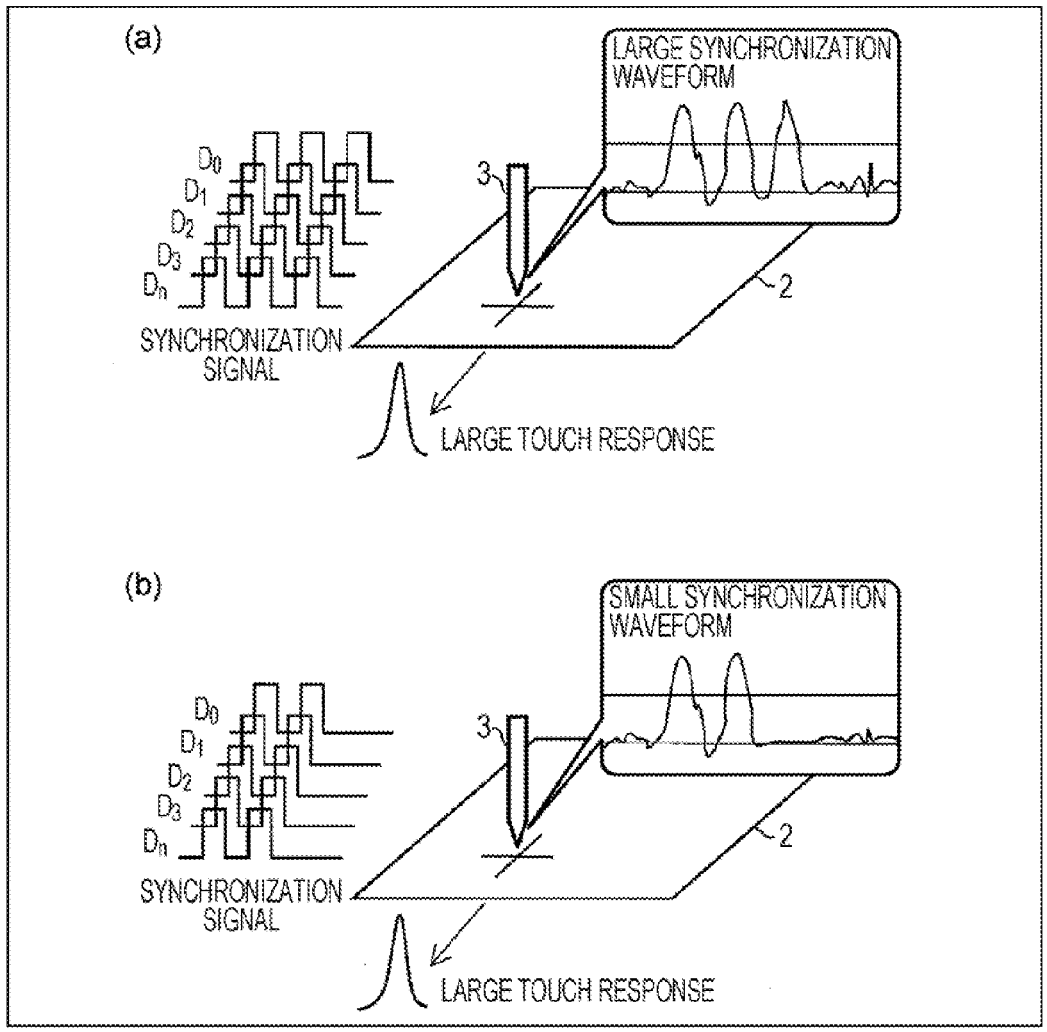

FIG. 13 is a diagram illustrating a schematic configuration of the touch panel controller 4c provided in the touch panel system according to the present embodiment.

As illustrated in the drawing, the control unit 18c provided in the touch panel controller 4c receives, from the processing unit 20, touch response magnitude data (the distance between the stylus pen 3 and the touch panel 2) detected from changes in the electrostatic capacitance due to touch, and outputs to the drive line driving circuit 15 a synchronization signal drive pattern select signal that selects a drive pattern of the synchronization signal according to the magnitude of the touch response.

Specifically, when the magnitude of the touch response is a designated value or greater, a synchronization signal drive pattern that shortens the output period of the synchronization signal is selected.

FIG. 14(a) illustrates a case in which the synchronization signal is output to all drives lines $D_0$ to $D_n$ during a normal period, while FIG. 14(b) is a diagram illustrating a case in which the synchronization signal is output to all drive lines $D_0$ to $D_n$ during a shorter-than-normal period.

As illustrated in the drawing, in the case of FIG. 14(b), the magnitude of the waveform of the synchronization signal sensed by the stylus pen 3, although small compared to the case of FIG. 14(a), exceeds a designated reference value.

Consequently, by selecting a synchronization signal drive pattern by which the synchronization signal is output over a shorter-than-normal period within a range that still allows for consistent synchronization between the stylus pen 3 and the touch panel controller 4b, it is possible to realize a touch panel system 1 able to moderate the amount of power consumed when synchronizing drive timings between the stylus pen 3 and the touch panel controller 4c that drives the touch panel 2 while also keeping the stylus pen 3 and the touch panel controller 4c consistently synchronized, and thereby operate with low power consumption.

Note that the configuration according to the present embodiment may also be used in combination with Embodiments 1 to 3 discussed earlier. Furthermore, if the number of drive lines to drive in FIG. 8(b) of Embodiment 1 is treated as the output period of the synchronization signal, a new relationship between the amplitude of the synchronization signal received at the pen tip of the stylus pen 3 and the hover height (distance between the stylus pen 3 and the touch panel 2) may be computed, and the output period of the synchronization signal may be shortened in multiple stages according to the touch response magnitude data (distance between the stylus pen 3 and the touch panel 2).

Note that as discussed earlier, when a synchronization signal drive pattern that shortens the output period of the synchronization signal is selected, and the synchronization period is shortened, the time until touch detection operation starts may be configured as a wait time, or the touch detection operation may be configured to start immediately without specifically waiting.

In the case of configuring the time until touch detection operation starts as a wait time, a power-reducing effect may be obtained, while in the case of configuring the touch detection operation to start immediately without specifically waiting, an effect of shortening the periodicity of the touch detection operation, or in other words an effect enabling touch coordinates to be obtained more frequently, may be obtained.

Note that in the case of using a waveform from an m-sequence as the waveform of the synchronization signal, if the length of the original waveform is based on m-sequence data for $2^N-1$ bits, the shorter patterns become waveforms based on data with bit lengths of $2^{N-1}-1$, $2^{N-2}-1$, and so on.

Embodiment 5

Next, Embodiment 5 of the present invention will be described on the basis of FIGS. 15 to 19. The touch panel system according to the present embodiment differs from the above Embodiments 1 to 4 by being configured to detect the touch position while switching between the drive lines $D_0$ to $D_n$ and the sense lines $S_0$ to $S_k$ on a fixed cycle. Otherwise, the configuration is as described in Embodiments 1 to 4. For the sake of convenience, members having the same function as the members illustrated in the drawings of the above Embodiments 1 to 4 are given the same signs, and description thereof will be reduced or omitted.

Figure 15:
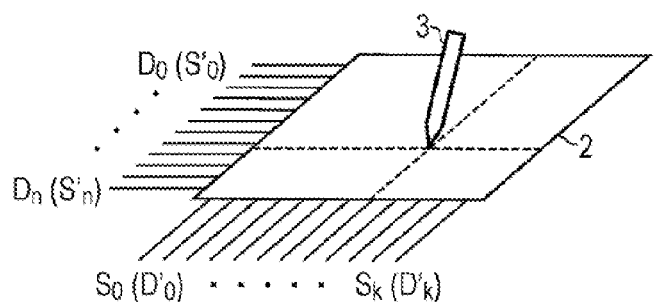
FIG. 15 is a diagram illustrating a touch panel and a stylus pen provided in the touch panel system according to Embodiment 5.
Figure 16:
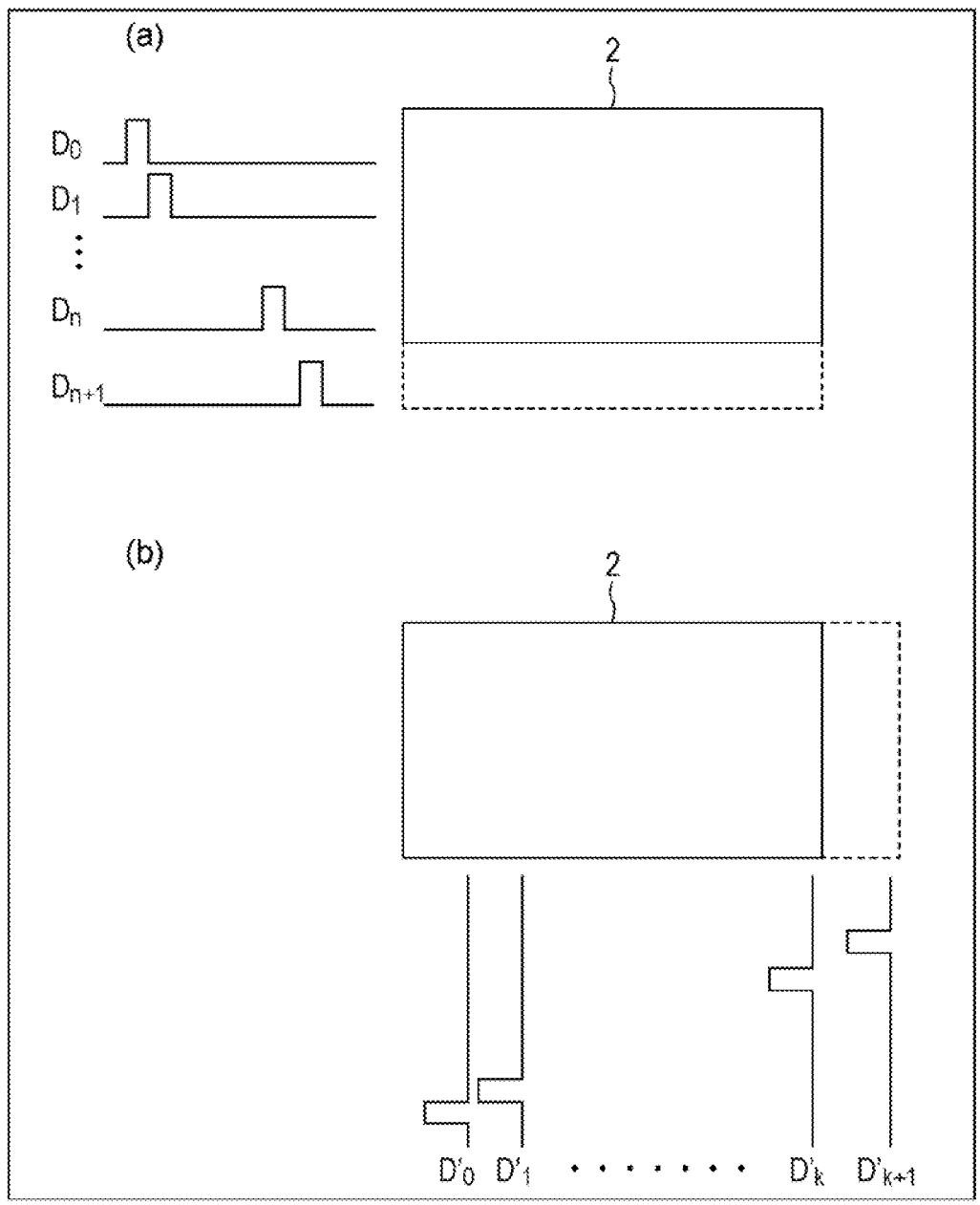

FIG. 15 is a diagram illustrating the touch panel 2 and the stylus pen 3 provided in the touch panel system according to the present embodiment.

As illustrated in the drawing, the drive lines $D_0$ to $D_n$ and the sense lines $S_0$ to $S_k$ provided in the touch panel 2 are switched on a fixed cycle, so that the drive lines $D_0$ to $D_n$ become the sense lines $S_0'$ to $S_n'$ and the sense lines $S_0$ to $S_k$ become the drive lines $D_0'$ to $D_k'$. Note that k and n above may be the same or different from each other.

FIG. 16(a) illustrates the timings at which the drive lines $D_0$ to $D_n$ provided in the touch panel 2 are used as drive lines, while FIG. 16(b) illustrates the timings at which the sense lines $S_0$ to $S_k$ provided in the touch panel 2 are used as drive lines.

Additionally, in the present embodiment, as a result of the stylus pen 3 coming close to the touchscreen of the touch panel 2, the stylus pen 3 detects the synchronization signal output from a touch panel controller 21 to each of the drive lines $D_0$ to $D_n$ or the drive lines $D_0'$ to $D_k'$, and the touch panel controller 21 and the stylus pen 3 are synchronized.

Furthermore, during the touch and pen input detection period, the touch panel controller 21 drives each of the drive lines $D_0$ to $D_n$ ($D_0'$ to $D_k'$) while also detecting, via each of the sense lines $S_0$ to $S_k$ ($S_0'$ to $S_n'$), changes in the electrostatic capacitance due to touch.

Note that in the present embodiment, by driving the pen tip of the stylus pen 3 with a waveform corresponding to the drive line $D_{n+1}$ or $D'_{k+1}$, changing the electrostatic capacitance on the touchscreen of the touch panel 2, and detecting the change in the electrostatic capacitance via each of the sense lines $S_0$ to $S_k$ ($S_0'$ to $S_n'$), the touch panel controller is able to detect additional information, such as the state of whether or not a button provided on the stylus pen 3 is being pressed by the user, or the pen pressure.

Additionally, the distance between the touch panel 2 and the stylus pen 3 may be computed by the touch panel controller 21 from changes in the electrostatic capacitance due to touch.

Figure 17:
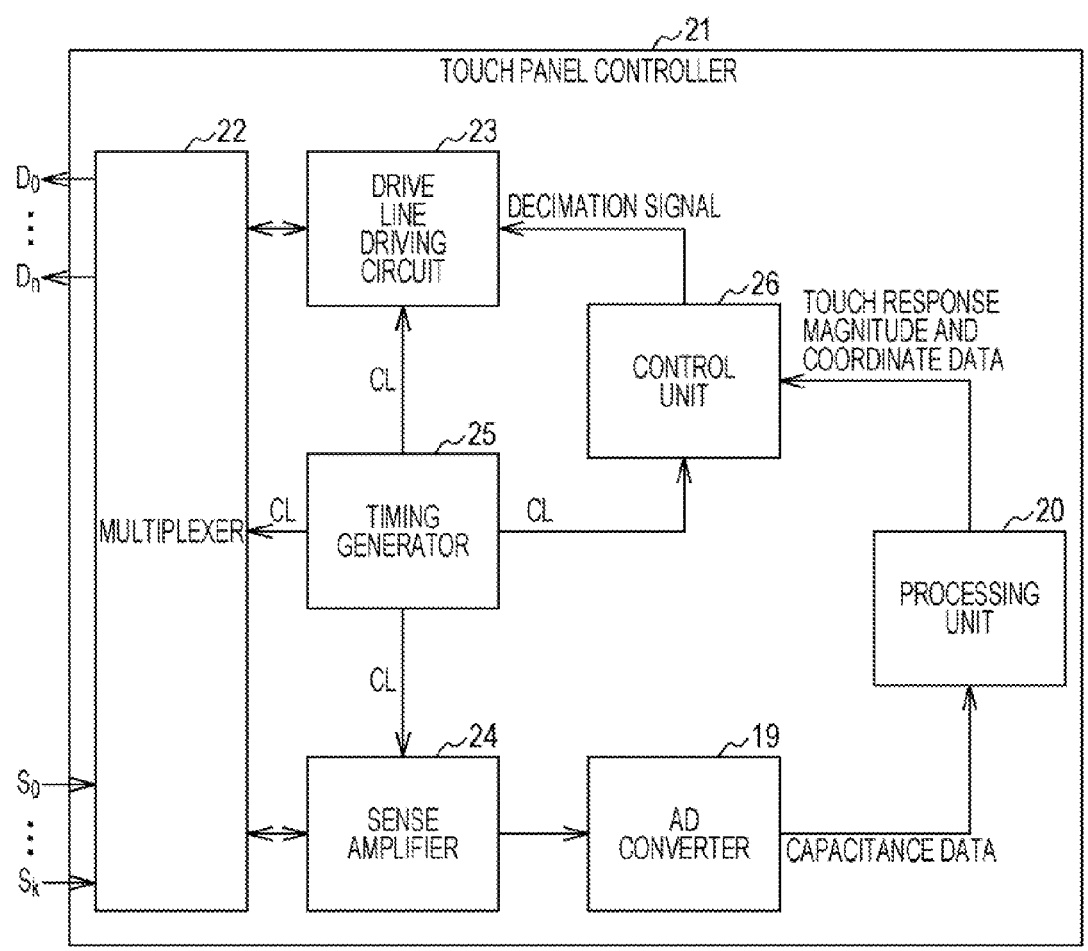
FIG. 17 is a diagram illustrating a schematic configuration of a touch panel controller provided in the touch panel system according to Embodiment 5.

FIG. 17 is a diagram illustrating a schematic configuration of the touch panel controller 21 provided in the touch panel system according to the present embodiment.

As illustrated in the drawing, the touch panel controller 21 is equipped with an AD converter 19, a processing unit 20, a multiplexer 22, a drive line driving circuit 23, a sense amplifier 24, a timing generator 25, and a control unit 26.

On a fixed cycle, the multiplexer 22 switches the target lines connected to the drive line driving circuit 23 from the drive lines $D_0$ to $D_n$ ($D_0'$ to $D_k'$) to the drive lines $D_0'$ to $D_k'$ ($D_0$ to $D_n$), and at the same time switches the target lines connected to the sense amplifier 24 from the sense lines $S_0$ to $S_k$ ($S_0'$ to $S_0'$) to the sense lines $S_0'$ to $S_n'$ ($S_0$ to $S_k$)

In other words, the multiplexer 22 is a connection-switching circuit that switches connections between multiple inputs and multiple outputs.

Figure 18:
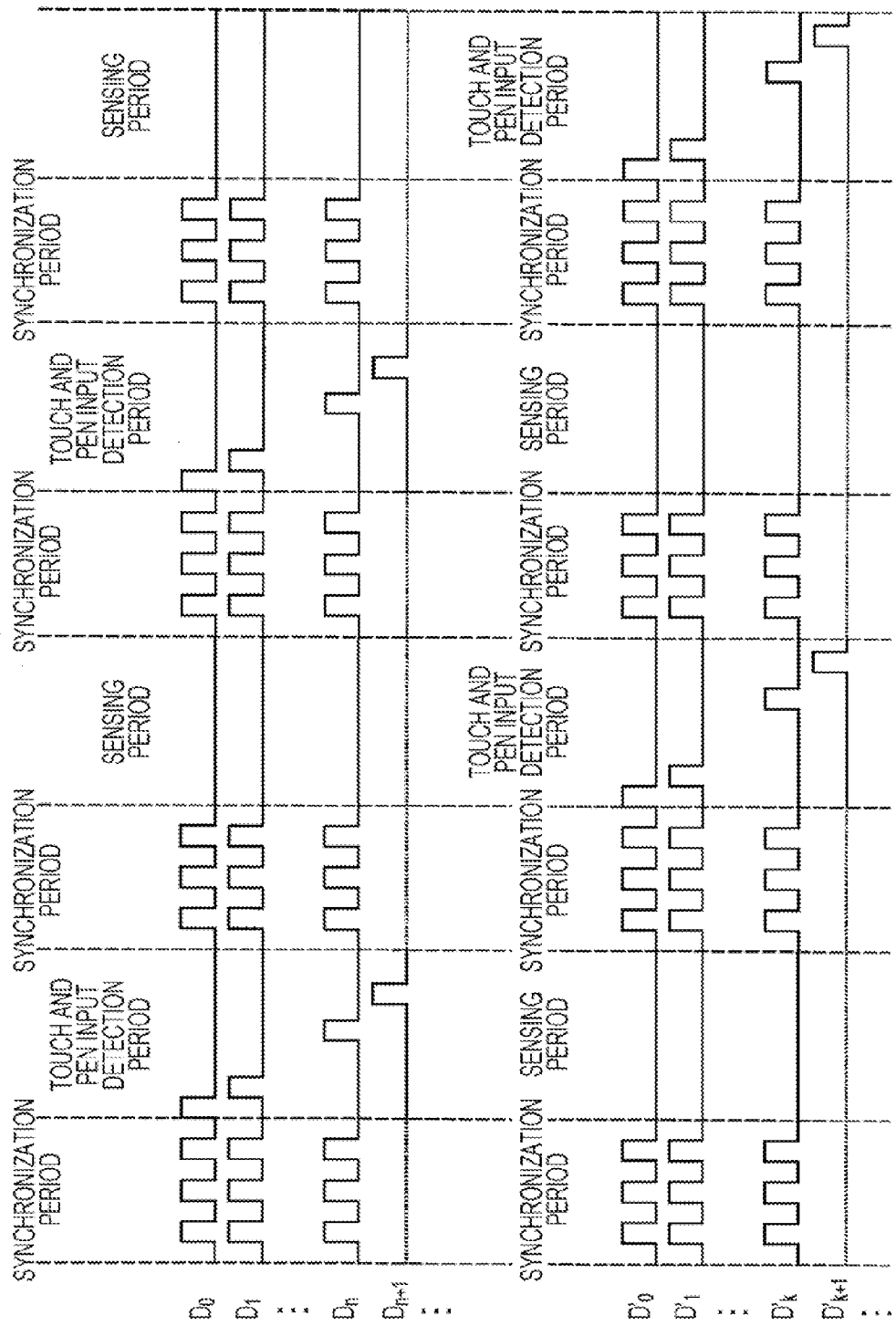
FIG. 18 is a diagram illustrating an example of signals output from a touch panel controller to drive lines $D_0$ to $D_n$ or drive lines $D_0'$ to $D_k'$, and an output waveform corresponding to a drive line $D_{n+1}$ or $D'_{k+1}$ driven by a stylus pen.

FIG. 18 is a diagram illustrating an example of signals output from the touch panel controller 21 to the drive lines $D_0$ to $D_n$ and the drive lines $D_0'$ to $D_k'$.

As illustrated in the drawing, a signal that alternately exists in the touch and pen input detection period and the sensing period on a designated cycle is output to the drive lines $D_0$ to $D_n$ (sense lines $S_0'$ to $S_k'$) and the drive lines $D_0'$ to $D_k'$ (sense lines $S_0$ to $S_n$).

Additionally, in FIG. 18, the same waveform is also detected in the synchronization period immediately after the touch and pen input detection period (immediately before the sensing period). This is because in the present embodiment, when the synchronization signal is output from the drive line driving circuit 23, the multiplexer 22 is used to output the synchronization signal to all of the drive lines $D_0$ to $D_n$ and the drive lines $D_0'$ to $D_k'$.

Note that it is not strictly necessary for the synchronization signal to be output to all of the drive lines $D_0$ to $D_n$ and the drive lines $D_0'$ to $D_k'$, and the synchronization signal may also be output alternately to the drive lines $D_0$ to $D_n$ and the drive lines $D_0'$ to $D_k'$.

As illustrated in FIG. 17, the control unit 26 provided in the touch panel controller 21 receives, from the processing unit 20, touch response magnitude data (the distance between the stylus pen 3 and the touch panel 2), and if the magnitude of the touch response is enough to detect the touch coordinates, also receives touch coordinate data from the processing unit 20.

Next, the control unit 26 outputs to the drive line driving circuit 23 a decimation signal causing the output of the synchronization signal only to the drive lines in a region neighboring the touch coordinates from among the drive lines $D_0$ to $D_n$ and the drive lines $D_0'$ to $D_k'$.

The following describes in detail how many drive lines centered on the touch coordinates from among the drive lines $D_0$ to $D_n$ and the drive lines $D_0'$ to $D_k'$ are sufficient to output the synchronization signal to.

First, regarding the movement of the stylus pen 3, the speed up to which movement of the touch position should be tracked is decided on the basis of the specifications of the touch panel system.

Next, based on the periodicity of the synchronization period and the above speed, the number of drive lines across which the stylus pen 3 may possibly move until the next synchronization period is computed.

Described in terms of a specific example, suppose that the synchronization period is 1 ms, the touch and pen input detection period is 9 ms, the movement speed of the stylus pen 3 is 1000 mm/s (the maximum movement speed of the stylus pen 3 to be supported, based on the specifications of the touch panel system), and the pitch of the drive lines $D_0$ to $D_n$ and the drive lines $D_0'$ to $D_k'$ is 5 mm. In this case, from the touch coordinates of the stylus pen 3 initially detected using the drive lines $D_0$ to $D_n$ and the sense lines $S_0$ to $S_k$, the next touch coordinates detected 10 ms later using the drive lines $D_0'$ to $D_k'$ and the sense lines $S_0'$ to $S_n'$ may possibly have moved across two of the drive lines $D_0$ to $D_n$ and the drive lines $D_0'$ to $D_k'$.

Figure 19:
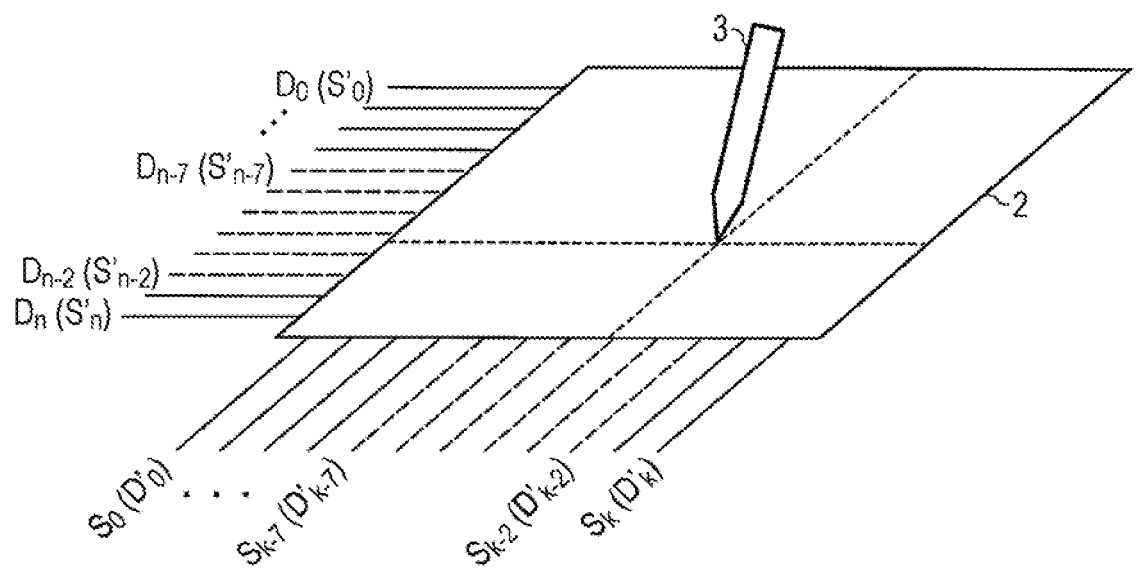
FIG. 19 is a diagram illustrating a case in which a synchronization signal is output only to six drive lines $D_{n-2}$ to $D_{n-7}$ or drive lines $D'_{n-2}$ to $D'_{n-7}$.

Consequently, as illustrated in FIG. 19, when the touch coordinates of the stylus pen 3 initially detected using the drive lines $D_0$ to $D_n$ and the sense lines $S_0$ to $S_k$ are between the drive lines $D_{n-3}$ and $D_{n-4}$ and between the sense lines $S_{k-3}$ and $S_{k-4}$, it is sufficient to output the synchronization signal only to the six lines from the drive lines $D_{n-2}$ to $D_{n-7}$, and the six lines from the drive lines $D_{k-2}'$ to $D_{k-7}'$.

Note that when the synchronization signal is output alternately to the drive lines $D_0$ to $D_n$ and the drive lines $D_0'$ to $D_k'$, it is sufficient to output the synchronization signal only to the drive lines $D_{n-2}$ to $D_{n-7}$ or the drive lines $D_{k-2}'$ to $D_{k-7}'$ to which the synchronization signal is to be output after touch coordinates are detected.

By using such a configuration, it is possible t realize a touch panel system able to moderate the amount of power consumed when synchronizing drive timings between the stylus pen 3 and the touch panel controller 21 that drives the touch panel 2 while also keeping the stylus pen 3 and the touch panel controller 21 consistently synchronized, and thereby operate with low power consumption.

Note that the present embodiment describes the case of combining the configuration of Embodiment 2 discussed earlier with a configuration that detects the touch position while switching between the drive lines $D_0$ to $D_n$ and the sense lines $S_0$ to $S_k$ on a fixed cycle. Obviously, however, Embodiments 1, 3, and 4 discussed earlier may also be combined with a configuration that detects the touch position while switching between the drive lines $D_0$ to $D_n$ and the sense lines $S_0$ to $S_k$ on a fixed cycle.

CONCLUSION

The touch panel system according to Aspect 1 of the present invention is a touch panel system including a touch panel having an electrostatic capacitance formed respectively at the intersections between multiple first signal lines and multiple second signal lines, a touch panel controller, and a pen, the touch panel system detecting a touch position from changes in the electrostatic capacitance. The touch panel controller outputs a first synchronization signal for synchronizing the pen and the touch panel controller to each of the multiple first signal lines and/or each of the multiple second signal lines, outputs a driving signal after the first synchronization signal to each of one of either the first signal lines or the second signal lines, and reads a detection signal detecting the touch position from each of the other of either the first signal lines or the second signal lines in conjunction with the driving signal. Also, the touch panel controller computes, on the basis of the detection signal detecting the touch position, the distance between the pen and the touch panel in the period in which the driving signal is output, and if the distance is less than a designated value, the touch panel controller outputs a second synchronization signal having a smaller driving power than the driving power in a case of outputting the first synchronization signal to the first signal lines and/or the second signal lines after the period in which the driving signal is output.

According to the above configuration, when the distance between the pen and the touch panel detected by the touch panel controller is less than a designated value, the touch panel controller outputs a second synchronization signal having a smaller driving power than the driving power in a case of outputting the first synchronization signal to the first signal lines and/or the second signal lines after the period in which the driving signal is output.

Consequently, it is possible to realize a touch panel system able to moderate the amount of power consumed when synchronizing drive timings between a pen and a touch panel controller, and operate with low power consumption.

In the touch panel system according to Aspect 2 of the present invention, the touch panel controller may also be configured so that in a case of outputting the second synchronization signal, the touch panel controller outputs the second synchronization signal only to a selected subset of signal lines from among each of the first signal lines and/or each of the multiple second signal lines, so that the second synchronization signal is detectable by the pen.

According to the above configuration, the second synchronization signal is output only to a selected subset of signal lines from among each of the first signal lines and/or each of the multiple second signal lines, so that the second synchronization signal is detectable by the pen. Thus, it is possible to realize a touch panel system able to moderate the amount of power consumed when synchronizing drive timings between a pen and a touch panel controller, and operate with low power consumption.

In the touch panel system according to Aspect 3 of the present invention, the touch panel controller may also be configured so that in a case of outputting the second synchronization signal, the touch panel controller outputs the second synchronization signal only to the first signal lines and/or the second signal lines neighboring the touch position from among each of the first signal lines and/or each of the second signal lines.

According to the above configuration, the second synchronization signal is output only to the first signal lines and/or the second signal lines neighboring the touch position from among each of the first signal lines and/or each of the second signal lines. Thus, it is possible to realize a touch panel system able to moderate the amount of power consumed when synchronizing drive timings between a pen and a touch panel controller, and operate with low power consumption.

In the touch panel system according to Aspect 4 of the present invention, the voltage value of the second synchronization signal when risen preferably is smaller than the voltage value of the first synchronization signal when risen.

According to the above configuration, the voltage value of the second synchronization signal when risen is smaller than the voltage value of the first synchronization signal when risen. Thus, it is possible to realize a touch panel system able to moderate the amount of power consumed when synchronizing drive timings between a pen and a touch panel controller, and operate with low power consumption.

In the touch panel system according to Aspect 5 of the present invention, the output period of the second synchronization signal preferably is shorter than the output period of the first synchronization signal.

According to the above configuration, the output period of the second synchronization signal is shorter than the output period of the first synchronization signal, and thus the synchronization period becomes shorter.

When the synchronization period is shortened, the time until the start of touch detection operation may be configured as a wait time, or the touch detection operation may be configured to start immediately without specifically waiting.

In the case of configuring the time until touch detection operation starts as a wait time, a power-reducing effect may be obtained, while in the case of configuring the touch detection operation to start immediately without specifically waiting, an effect of shortening the periodicity of the touch detection operation, or in other words an effect enabling touch coordinates to be obtained more frequently, may be obtained.

In the touch panel system according to Aspect 6 of the present invention, the designated value related to the distance between the pen and the touch panel may be computed from a range of amplitudes of the synchronization signal at which consistent synchronization is possible, and a range of distances between the pen and the touch panel at which the detection of the proximity of the pen is desired, or a range of distances between the pen and the touch panel to be used for touch operations.

According to the above configuration, it is possible to realize a touch panel system able to moderate the amount of power consumed when synchronizing drive timings between the pen and the touch panel controller that drives the touch panel while also keeping the pen and the touch panel controller consistently synchronized, and thereby operate with low power consumption.

In the touch panel system according to Aspect 7 of the present invention, the first signal lines and/or the second signal lines neighboring the touch position preferably are determined by a magnitude by which the pen moves until the second synchronization signal is output.

According to the above configuration, it is possible to realize a touch panel system able to moderate the amount of power consumed when synchronizing drive timings between the pen and the touch panel controller that drives the touch panel while also keeping the pen and the touch panel controller consistently synchronized, and thereby operate with low power consumption.

Note that the present invention is not limited to the embodiments discussed above, and various modifications are possible within the scope indicated by the claims. Embodiments obtained by appropriately combining the technical means respectively disclosed in different embodiments are also included within the technical scope of the present invention.

INDUSTRIAL APPLICABILITY

The present invention may be used favorably in a touch panel system equipped with a touch panel, a touch panel controller, and a touch pen.

REFERENCE SIGNS LIST 1 touch panel system
2 touch panel
3 stylus pen (pen)
4 touch panel controller
4a touch panel controller
4b touch panel controller
4c touch panel controller
5 pen body
5a grip portion
6 pen tip portion
6a pen tip cover
6b pen tip shaft
6c insulator
6d pen pressure sensor
7 connection switch
8 control circuit
9a mode toggle switch
9b mode toggle switch
10 sense circuit
11 synchronization signal detection circuit
12 timing adjustment circuit
13 drive circuit
14a first operating switch
14b second operating switch
15 drive line driving circuit
16 sense amplifier
17 timing generator
18 control unit
18a control unit
18b control unit
18c control unit
19 AD converter
20 processing unit
21 touch panel controller
22 multiplexer
23 drive line driving circuit
24 sense amplifier
25 timing generator
26 control unit
$C_{nm}$ electrostatic capacitance
$D_n$ drive line (first signal line or second signal line)
$S_m$ sense line (first signal line or second signal line)
$S_k$ sense line (first signal line or second signal line)

The invention claimed is:

1. A touch panel system comprising: a touch panel having an electrostatic capacitance formed respectively at the intersections between a plurality of first signal lines and a plurality of second signal lines; a touch panel controller; and a pen, the touch panel system detecting a touch position from changes in the electrostatic capacitance, wherein
the touch panel controller outputs a first synchronization signal for synchronizing the pen and the touch panel controller to each of the plurality of first signal lines and/or each of the plurality of second signal lines, outputs a driving signal after the first synchronization signal to each of one of either the first signal lines or the second signal lines, and reads a detection signal detecting the touch position from each of the other of either the first signal lines or the second signal lines in conjunction with the driving signal,
computes, on the basis of the detection signal detecting the touch position, the distance between the pen and the touch panel in the period in which the driving signal is output, and
if the distance is less than a designated value, the touch panel controller outputs a second synchronization signal having a smaller driving power than the driving power in a case of outputting the first synchronization signal to the first signal lines and/or the second signal lines after the period in which the driving signal is output, wherein
the touch panel controller, in a case of outputting the second synchronization signal, outputs the second synchronization signal only to the first signal lines and/or the second signal lines neighboring the touch position from among each of the first signal lines and/or each of the second signal lines,
wherein the touch panel controller determines which of the first signal lines and/or second signal lines are neighboring the touch position according to a magnitude of pen movement until the second synchronization signal is output.

2. The touch panel system according to claim 1, wherein the touch panel controller, in a case of outputting the second synchronization signal, outputs the second synchronization signal only to a selected subset of signal lines from among each of the first signal lines and/or each of the second signal lines, so that the second synchronization signal is detectable by the pen.

3. The touch panel system according to claim 1, wherein a voltage value of the second synchronization signal in a case of being risen is smaller than a voltage value of the first synchronization signal in a case of being risen.

4. The touch panel system according to claim 1, wherein an output period of the second synchronization signal is shorter than an output period of the first synchronization signal.

* * * * *